United States Patent
Auyang et al.

(10) Patent No.: US 11,877,621 B2
(45) Date of Patent: *Jan. 23, 2024

(54) FOOTWEAR STROBEL WITH BLADDER AND TENSILE COMPONENT AND METHOD OF MANUFACTURING

(71) Applicant: NIKE, Inc., Beaverton, OR (US)

(72) Inventors: Arick Auyang, Portland, OR (US); Derek Houng, Portland, OR (US); Jason R. Meeker, Hillsboro, OR (US); Eric A. Schmalzer, Portland, OR (US); Jeffrey S. To, Portland, OR (US); Geoffrey A. Weston, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/541,382

(22) Filed: Dec. 3, 2021

(65) Prior Publication Data

US 2022/0087363 A1 Mar. 24, 2022

Related U.S. Application Data

(62) Division of application No. 16/428,010, filed on May 31, 2019, now Pat. No. 11,219,271.

(60) Provisional application No. 62/678,450, filed on May 31, 2018.

(51) Int. Cl.
*A43B 9/02* (2006.01)
*A43B 13/20* (2006.01)
(Continued)

(52) U.S. Cl.
CPC ............... *A43B 13/20* (2013.01); *A43B 9/02* (2013.01); *A43B 13/04* (2013.01); *A43B 13/28* (2013.01);
(Continued)

(58) Field of Classification Search
CPC .. A43B 9/02; A43B 9/06; A43B 13/20; A43B 13/38; A43B 13/386; A43B 13/39; A43B 13/40; A43D 3/022
See application file for complete search history.

(56) References Cited

U.S. PATENT DOCUMENTS 1,346,146 A * 7/1920 Warren ................. A43D 3/022
36/43
3,302,313 A * 2/1967 Isaacson ................ A43D 3/022
36/43
(Continued)

FOREIGN PATENT DOCUMENTS

| CN | 1280802 A | 1/2001 |
|---|---|---|
| CN | 103126187 A | 6/2013 |
| DE | 202016106142 U1 | 11/2016 |

*Primary Examiner* — Sharon M Prange
(74) *Attorney, Agent, or Firm* — Quinn IP Law

(57) ABSTRACT

An article of footwear includes a strobel that has a polymeric bladder defining an interior cavity and configured to retain a fluid in the interior cavity. The polymeric bladder has a peripheral flange extending around at least a portion of a perimeter of the interior cavity. A tensile component is disposed in the interior cavity. The tensile component is secured to opposing inner surfaces of the polymeric bladder. The peripheral flange defines a groove extending along the peripheral flange. The groove serves as a guide path for an operator or for a machine to follow when stitching or otherwise securing the strobel to the upper. A method of manufacturing footwear is included.

15 Claims, 24 Drawing Sheets

(51) Int. Cl.
*A43B 13/40* (2006.01)
*A43D 3/02* (2006.01)
*A43B 13/04* (2006.01)
*A43B 13/28* (2006.01)
*B29D 35/14* (2010.01)
*A43B 13/39* (2006.01)

(52) U.S. Cl.
CPC .............. *A43B 13/39* (2013.01); *A43B 13/40* (2013.01); *A43D 3/022* (2013.01); *B29D 35/142* (2013.01)

(56) References Cited

U.S. PATENT DOCUMENTS

| | | | | |
|---|---|---|---|---|
| 3,431,570 A * | 3/1969 | Murphy | .................... | A43B 3/14 36/11 |
| 3,935,609 A * | 2/1976 | Brotchie | ................ | A43D 3/022 12/128 D |
| 4,183,156 A * | 1/1980 | Rudy | ..................... | A43B 13/40 36/44 |
| 5,733,647 A * | 3/1998 | Moore, III | ........... | A43B 7/1464 36/43 |
| 2008/0276490 A1* | 11/2008 | Holt | ..................... | B29D 35/124 36/28 |
| 2010/0180466 A1* | 7/2010 | Ho | ........................... | A43B 9/06 36/16 |
| 2012/0023686 A1* | 2/2012 | Huffa | .................. | A43B 23/025 12/145 |
| 2012/0260526 A1* | 10/2012 | Smith | .................... | A43B 13/20 36/83 |
| 2013/0091729 A1* | 4/2013 | Lagneau | ................ | A43B 13/20 36/43 |
| 2015/0374070 A1* | 12/2015 | Tawney | .................. | A43B 1/14 36/87 |
| 2019/0045880 A1* | 2/2019 | Li | ........................ | B29D 35/148 |
| 2019/0365046 A1* | 12/2019 | Calle | .................... | A43B 23/025 |

* cited by examiner

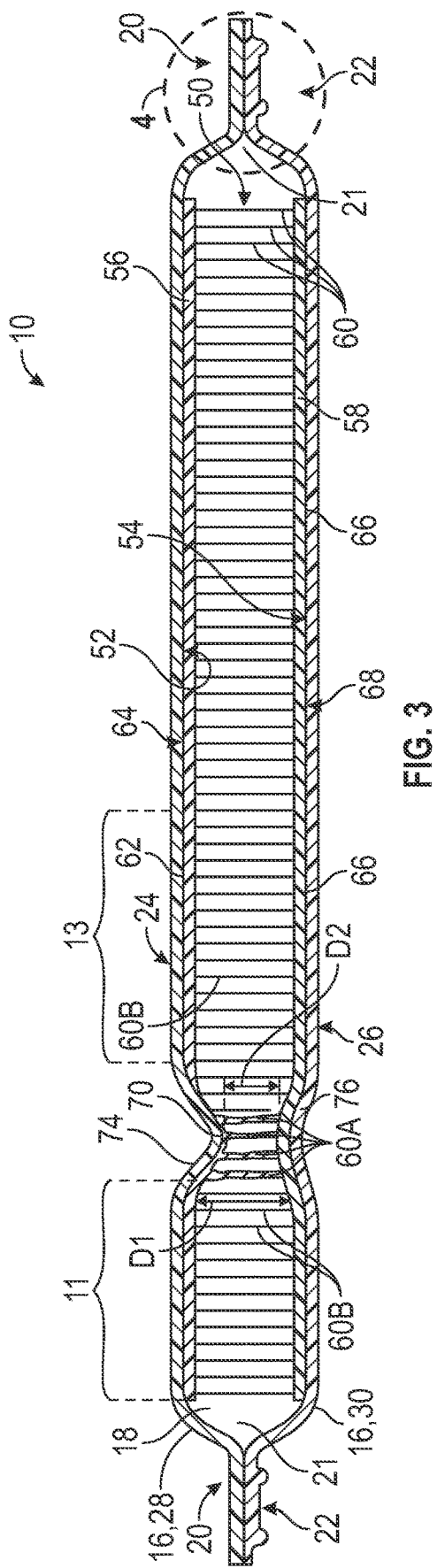
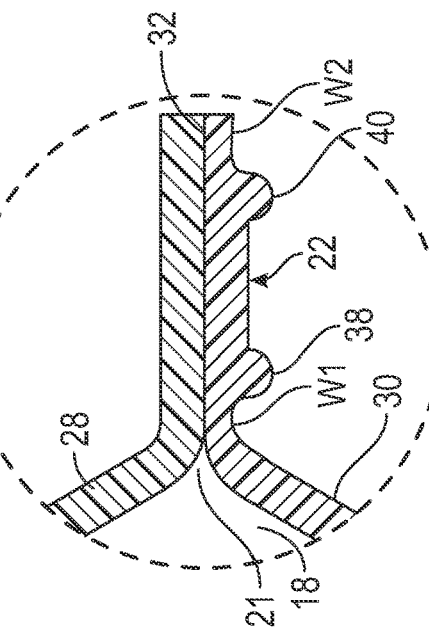
FIG. 3
FIG. 4

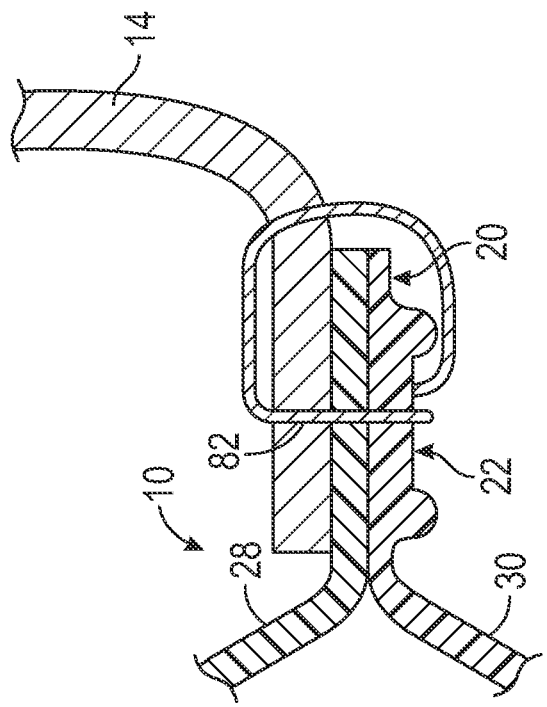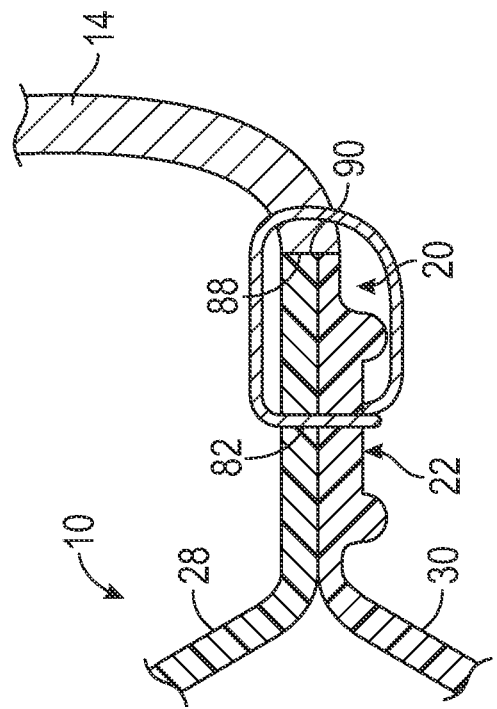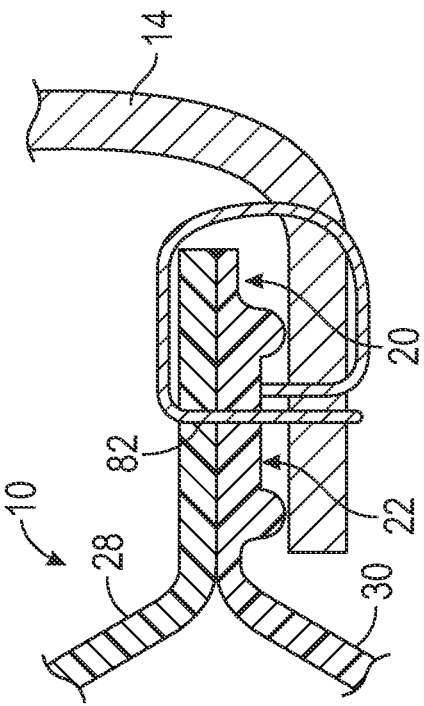

FOOTWEAR STROBEL WITH BLADDER AND TENSILE COMPONENT AND METHOD OF MANUFACTURING

CROSS-REFERENCE TO RELATED APPLICATIONS

This application is a divisional of U.S. application Ser. No. 16/428,010, filed May 31, 2019, which claims the benefit of priority to U.S. Provisional Application No. 62/678,450, filed May 31, 2018, both of which are incorporated by reference in their entirety.

TECHNICAL FIELD

The present teachings generally include a strobel for an article of footwear and a method of manufacturing footwear.

BACKGROUND

Articles of footwear generally include two primary elements: an upper and a sole structure. The sole structure is configured to be located under a wearer's foot to space the foot away from the ground. One method of manufacturing an article of footwear involves the use of a lasting process. The upper is tightened around the last, thereby imparting the general shape of the foot to the void within the upper.

BRIEF DESCRIPTION OF THE DRAWINGS

FIG. 3 is a schematic illustration in cross-sectional view of the strobel of FIG. 1 taken at lines 3-3 in FIG. 2.

FIG. 4 is a schematic illustration in close-up cross-sectional view of a portion of the strobel of FIG. 3.

FIG. 7 is a schematic illustration in fragmentary cross-sectional view of the flange of FIG. 4 and an upper stitched to the flange in a first arrangement.

FIG. 8 is a schematic illustration in fragmentary cross-sectional view of the flange of FIG. 4 and an upper stitched to the flange in a second arrangement.

FIG. 9 is a schematic illustration in fragmentary cross-sectional view of the flange of FIG. 4 and an upper stitched to the flange in a third arrangement.

DESCRIPTION

Figure 1:
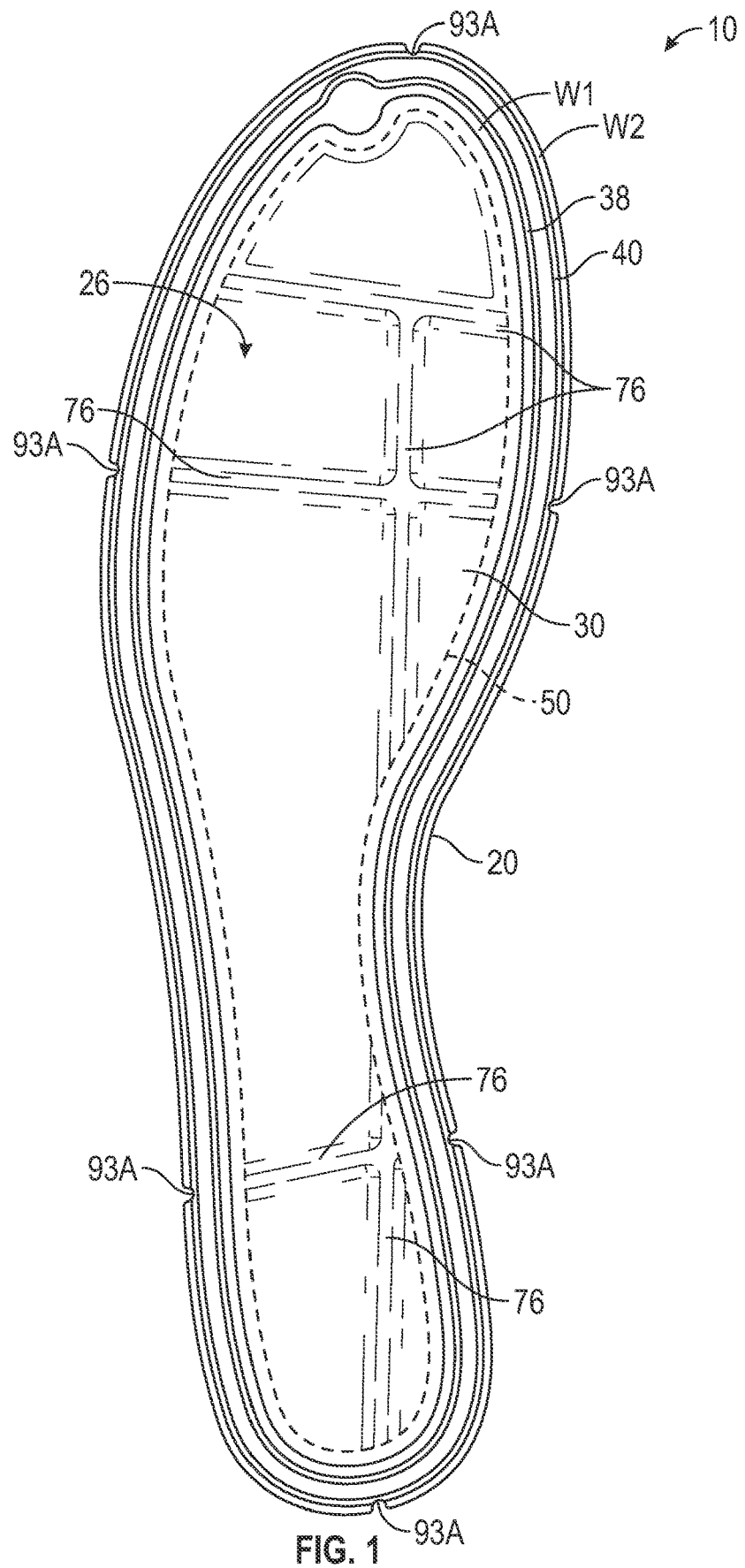
FIG. 1 is a schematic illustration in bottom view of a strobel for a first embodiment of an article of footwear.

Some footwear includes a strobel secured to a lower perimeter of the upper. Traditionally, a strobel is a relatively inelastic textile material. A strobel disclosed herein includes a bladder with a sealed, fluid-filled chamber, and may provide greater comfort, resiliency, and energy return than a strobel of a traditional material and configuration. A strobel configured as a bladder may be a polymeric material that may feel somewhat slippery and/or may be less flexible than traditional strobel material, making it more difficult to grip during manufacturing processes. Accordingly, it may be difficult to accurately stitch the strobel to the upper in a sufficiently short period of time that may be desired during mass production.

The strobel, the article of footwear, and a method of manufacturing footwear as configured and disclosed herein solves these problems while providing the benefits of a strobel with a fluid-filled bladder.

More particularly, an article of footwear comprises a strobel that includes a polymeric bladder defining an interior cavity and configured to retain a fluid in the interior cavity. The polymeric bladder may have a peripheral flange extending around at least a portion of a perimeter of the interior cavity. The strobel may also include a tensile component disposed in the interior cavity. The tensile component may be secured to opposing inner surfaces of the polymeric bladder. The peripheral flange may define a groove extending along the peripheral flange. The groove may serve as a guide path for an operator or for a machine, including a robotic machine, to follow when stitching or otherwise securing the strobel to the upper.

In one or more embodiments, the peripheral flange may have a first weld and a second weld spaced apart from the first weld. The first weld and the second weld may extend lengthwise along the peripheral flange. The groove may extend lengthwise along the peripheral flange between the first weld and the second weld. The first weld may be inward of the groove. The second weld may be outward of the groove.

In some embodiments, the groove is on a foot-facing side of the polymeric bladder, in other embodiments the groove is on a ground-facing side of the polymeric bladder, and in still other embodiments, both the foot-facing side and the ground-facing side have such a groove. This helps enable use of the polymeric bladder for an article of footwear configured for a right foot, and also, alternatively, for an article of footwear configured for a left foot. Stated differently, the strobel may be secured to an upper for a right foot article of footwear or may be flipped over for securement to an upper for a left foot article of footwear. In either case, one of the two grooves will be in the same position relative to the upper in both instances (e.g., disposed outward (away from the upper)) to serve as a guide for stitching.

By way of non-limiting example, the peripheral flange may include a first ridge protruding at an outer surface of the peripheral flange between the first weld and the groove, and a second ridge protruding at the outer surface of the peripheral flange between the second weld and the groove. The ridges may be due to material of the polymeric bladder displaced by the first and second welds. The ridges help to define the sides of the groove.

Additionally, the polymeric bladder may be configured with one or more locating features, such as at least one of a notch in an outer edge of the peripheral flange, a protrusion at the outer edge of the peripheral flange, an aperture in the polymeric bladder, a weld pattern of the polymeric bladder, or a marking on the polymeric bladder such as a printed marking. The locating feature(s) may be used for accurate alignment with an upper and/or a footwear last, as described herein.

In one or more embodiments, the polymeric bladder of the strobel may include a first polymeric sheet and a second polymeric sheet. The first polymeric sheet may be bonded to the second polymeric sheet at the peripheral flange. The tensile component may include a first tensile layer, a second tensile layer, and a plurality of tethers spanning the interior cavity from the first tensile layer to the second tensile layer and connecting the first tensile layer to the second tensile layer. The first polymeric sheet may be joined to the first tensile layer at a plurality of inwardly-protruding bonds that protrude inward from the first polymeric sheet only partially across the plurality of tethers toward the second polymeric sheet, and the polymeric bladder is narrowed at the inwardly-protruding bonds. For example, the bonds may be formed by a welding process, such as radio frequency or ultrasonic welding using tooling that results in welds by thermal bonding of the polymeric bladder. Other embodiments may not include any of the inwardly-protruding bonds.

In one or more embodiments, each of the inwardly-protruding bonds extends generally straight along an outer surface of the first polymeric sheet, and the inwardly-protruding bonds are arranged parallel or orthogonal relative to one another at the outer surface of the first polymeric sheet. This arrangement of the inwardly-protruding bonds may encourage flexibility of the strobel at the inwardly-protruding bonds.

Within the scope of the present disclosure, the article of footwear may further comprise an upper. The strobel may be secured to the upper by a series of stitches extending through the peripheral flange in the groove, the strobel and the upper defining a foot-receiving cavity. The series of stitches may further extend around an outer edge of the peripheral flange. The groove may be on a distal side of the peripheral flange, on a proximal side of the peripheral flange, or, in some embodiments, both the proximal side of the peripheral flange and the distal side of the peripheral flange have such a groove. A midsole may be secured to at least one of the upper or the polymeric bladder and may underlie a distal surface of the polymeric bladder. For example, after a last is placed in the upper that has been stitched to the strobel by the series of stitches at the peripheral flange, a midsole can be secured to at least one of the upper or the polymeric bladder, such as to a lower perimeter of the upper and a distal surface of the polymeric bladder. In some embodiments, the article of footwear may include a protective cover layer overlying a proximal surface of the polymeric bladder and secured to the polymeric bladder at the peripheral flange. The protective cover layer may protect the polymeric bladder from shear forces and/or from sharp objects.

A method of manufacturing footwear may comprise providing a strobel formed by placing a tensile component on a first polymeric sheet, placing a second polymeric sheet on the tensile component, and welding the first and second polymeric sheets to one another to define a polymeric bladder having an interior cavity, with the polymeric bladder configured to retain a fluid in the polymeric bladder, and having a peripheral flange extending around at least a portion of a perimeter of the interior cavity and at which the first and second polymeric sheets are welded. The tensile component may be disposed in the interior cavity and may be secured to opposing inner surfaces of the polymeric bladder, and the peripheral flange may define a groove extending along the peripheral flange.

Welding the first and second polymeric sheets to one another may include welding a first weld and a second weld that are spaced apart from one another and extend lengthwise along the peripheral flange, with the groove extending lengthwise along the peripheral flange between the first weld and the second weld. For example, the first weld and the second weld may be provided simultaneously via the same welding tooling assembly. Alternatively, the first weld and the second weld may be provided in succession by different tooling.

The method of manufacturing footwear may further comprise stitching the strobel to the upper along the groove in a peripheral flange of the strobel so that a series of stitches extends through the peripheral flange at the groove.

The method of manufacturing may further comprise placing the upper with the strobel stitched thereto on a footwear last. In one or more embodiments, the polymeric bladder may be in an uninflated state when the strobel is stitched to the upper, and the method may further comprise inflating the polymeric bladder after the strobel is stitched to the upper, and then sealing the interior cavity after inflating the interior cavity. Placing the upper with the strobel stitched thereto on the last is after inflating the polymeric bladder and sealing the interior cavity. In other embodiments, the strobel may be inflated prior to stitching the strobel to the upper and/or prior to placing the upper with the strobel stitched thereto on the last.

Placing the upper with the strobel stitched thereto on the last may include aligning a locating feature on the strobel with a locating feature on the last. For example, the locating feature on the strobel may be is at least one of a notch in an outer edge of the peripheral flange, an aperture in the polymeric bladder, a weld pattern of the polymeric bladder such as a pattern of inwardly-protruding bonds, or a marking on the polymeric bladder, such as a printed alignment pattern. The method may include securing a midsole to at least one of the upper or the strobel while the upper and the strobel are on the last.

In some embodiments, the method begins with the strobel already formed. In other embodiments, the method also includes forming the strobel by placing a first polymeric sheet in a mold cavity, placing the tensile component on the first polymeric sheet, placing a second polymeric sheet over the tensile component, and welding the first polymeric sheet and the second polymeric sheet to one another to define the peripheral flange having the groove.

The above features and advantages and other features and advantages of the present teachings are readily apparent from the following detailed description of the modes for carrying out the present teachings when taken in connection with the accompanying drawings.

Figure 14:
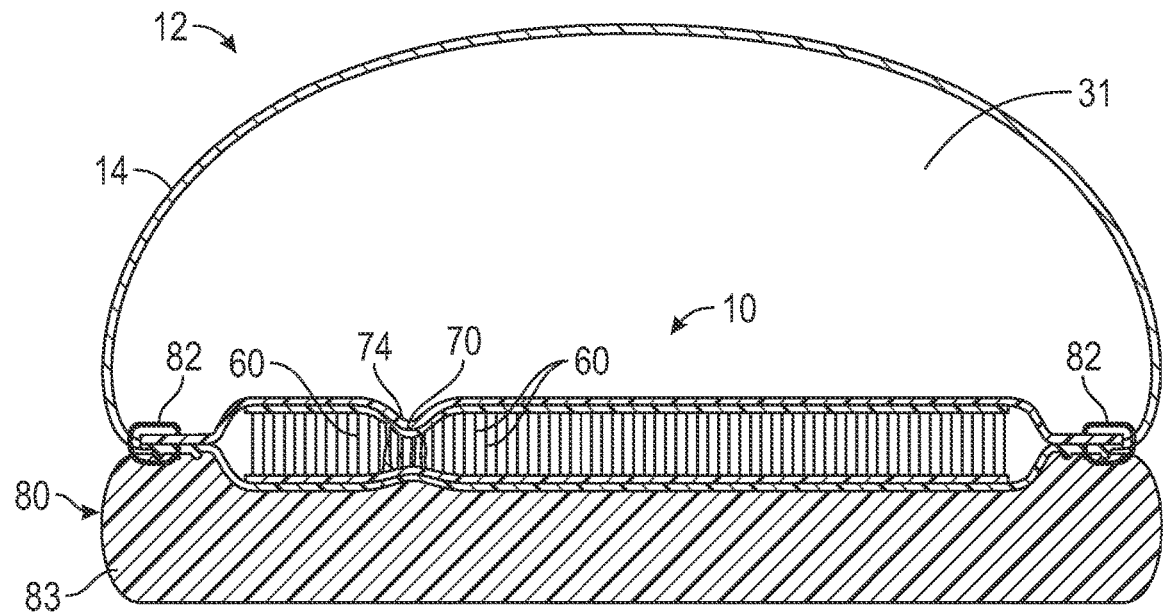
FIG. 14 is a schematic cross-sectional view of an article of footwear including the upper and strobel of FIG. 13 taken at lines 14-14 in FIG. 13 and inverted relative to FIG. 13, and with a midsole secured thereto.

Referring to the drawings, wherein like reference numbers refer to like components throughout the views, FIGS. 1-4 show a strobel 10 for an article of footwear 12 that includes an upper 14, shown, for example, in FIG. 14. The strobel 10 comprises a polymeric bladder 16 that defines an interior cavity 18 and is configured to retain a fluid in the interior cavity 18. The polymeric bladder 16 has a peripheral flange 20 extending around at least a portion of a perimeter 21 of the interior cavity 18. In the embodiment shown, the peripheral flange 20 extends around the entire perimeter 21 (e.g., outwardly surrounding the interior cavity 18) generally in an X-Y plane of the strobel 10, where the Z plane is the height of the strobel 10 from a proximal surface 24 of the strobel 10 to a distal surface 26 of the strobel 10. The peripheral flange 20 extends around the forefoot region 25, the midfoot region 27, and the heel region 29 of the strobel 10.

Figure 15:
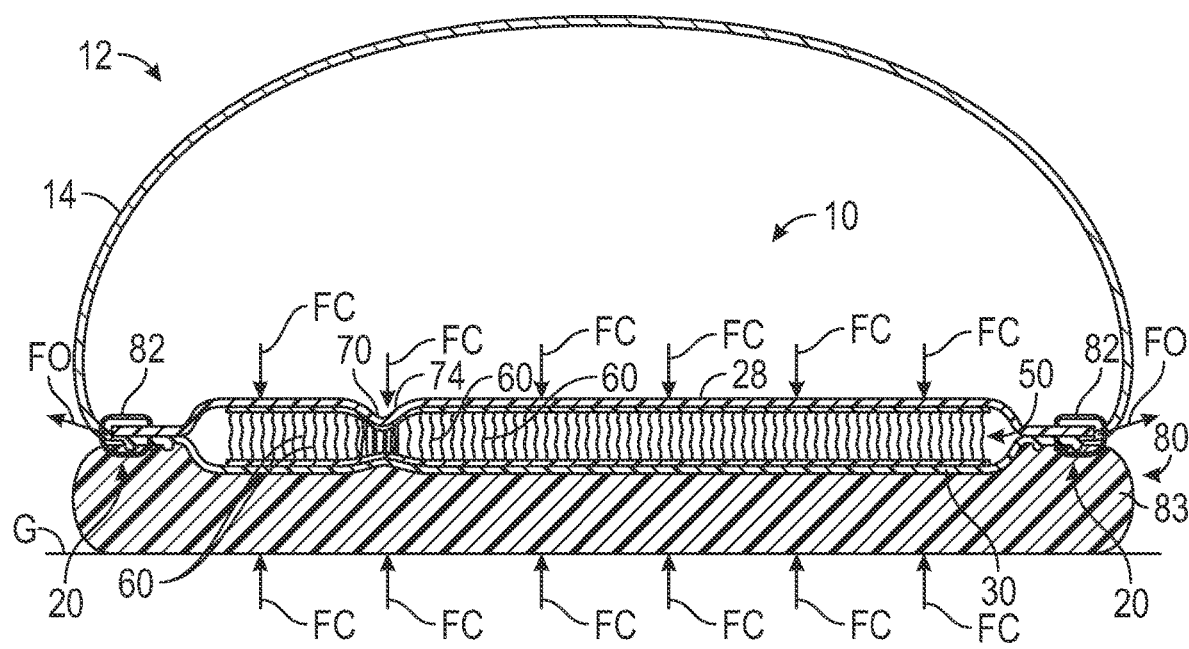
FIG. 15 is a schematic cross-sectional view of the upper and strobel of FIG. 14 under dynamic compressive loading of the strobel.

The peripheral flange 20 defines a groove 22 extending along the peripheral flange 20. As further discussed herein, the groove 22 serves as a guide path for an operator or for a machine, including a robotic machine, to follow when stitching or otherwise securing the strobel 10 to the upper 14. As shown in FIG. 15, when the strobel 10 is secured at its peripheral flange 20 to the upper 14, the strobel 10 and the upper 14 together define a foot-receiving cavity 31 as shown. Dynamic compressive loading of the sole structure 80 by a foot in the foot-receiving cavity 31, as represented by forces FC, may cause tension in the strobel 10 around the peripheral flange 20 in an outward direction as represented by outward forces FO, creating a trampoline like effect as the tension is subsequently relieved and the tethers 60 likewise return to their tensioned state.

The polymeric bladder 16 includes a first polymeric sheet 28 and a second polymeric sheet 30. The first polymeric sheet 28 is secured to the second polymeric sheet 30 at the peripheral flange 20 to enclose the interior cavity 18. Stated differently, when the sheets 28, 30 are secured together at the peripheral flange 20 and the polymeric bladder 16 is sealed, the first polymeric sheet 28 and the second polymeric sheet 30 retain a fluid in the interior cavity 18. As used herein, a "fluid" filling the interior cavity 18 may be a gas, such as air, nitrogen, another gas, or a combination thereof.

The first and second polymeric sheets 28, 30 can be a variety of polymeric materials that can resiliently retain a fluid such as nitrogen, air, or another gas. Examples of polymeric materials for the first and second polymeric sheets 28, 30 include thermoplastic urethane, polyurethane, polyester, polyester polyurethane, and polyether polyurethane. Moreover, the first and second polymeric sheets 28, 30 can each be formed of layers of different materials including polymeric materials. In one embodiment, each of the first and second polymeric sheets 28, 30 is formed from thin films having one or more thermoplastic polyurethane layers with one or more barrier layers of a copolymer of ethylene and vinyl alcohol (EVOH) that is impermeable to the pressurized fluid contained therein such as a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. Additional suitable materials for the first and second polymeric sheets 28, 30 are disclosed in U.S. Pat. Nos. 4,183,156 and 4,219,945 to Rudy which are incorporated by reference in their entireties. Further suitable materials for the first and second polymeric sheets 28, 30 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the strobel 10, engineering properties such as tensile strength, stretch properties, fatigue characteristics, dynamic modulus, and loss tangent can be considered. For example, the thicknesses of the first and second polymeric sheets 28, 30 used to form the strobel 10 can be selected to provide these characteristics.

With reference to FIG. 4, the peripheral flange 20 has a first weld W1 and a second weld W2 spaced apart from the first weld W1. The first weld W1 and the second weld W2 cause the first and second polymeric sheets 28, 30 to bond to one another at an interface 32 at the welds W1, W2. The welds W1 and W2 may be formed by using a tooling assembly (also referred to as a mold assembly) similar to that of FIGS. 19-21 that includes a first and a second mold portion 34A, 34B and a mold insert 34C, as shown and described in FIGS. 20-21. The mold portions 34A, 34B are closed together on the polymeric sheets 28, 30, with the tensile component 50 between the polymeric sheets 28, 30. The polymeric sheets 28, 30 and tensile component 50 are then welded by radio frequency welding (also referred to as high frequency or dielectric welding) or are secured by another manner of thermal or adhesive bonding, as a power source 36 supplies energy creating an alternating electric field that heats the polymeric sheets 28, 30 where the mold portions 34A, 34B or mold insert 34C are applied to the polymeric sheets 28, 30. In the tooling assembly of FIGS. 19-21, the welds W1, W2 are on the same side of the bladder 16 as are the inwardly-protruding bonds 70. In the bladder 16 shown in FIG. 3, the welds W1, W2 are on an opposite side of the bladder 16 from the inwardly-protruding bonds 70. This may be accomplished by securing the mold insert 34C to the mold portions 34A, for example. In an embodiment with welds W1, W2 on both sides of the peripheral flange 20, both mold portions 34A, 34B would include ridges 94, 96.

The first weld W1 and the second weld W2 extend lengthwise along the peripheral flange 20. As best shown in FIG. 1, the first weld W1 and the second weld W2 extend continuously along the entire peripheral flange 20 to completely surround (i.e., encircle) the interior cavity 18. The groove 22 extends lengthwise along the peripheral flange 20 between the first weld W1 and the second weld W2. The first weld W1 is inward of the groove 22. The second weld W2 is outward of the groove 22. Stated differently, the first weld W1 is inward of the groove 22 and the second weld W2 is outward of the groove 22 where inward is toward the center of the strobel 10 and outward is away from the center of the strobel 10.

Heating and pressure of the tooling assembly at the welds W1 and W2 may displace some of the material of the second polymeric sheet 30 so that the peripheral flange 20 may include a first ridge 38 protruding at an outer surface, e.g., the distal surface 26 of the peripheral flange 20 between the first weld W1 and the groove 22, and a second ridge 40 protruding at the distal surface 26 of the peripheral flange 20 between the second weld W2 and the groove 22. The ridges 38, 40 help to define the sides of the groove 22.

Figure 10:
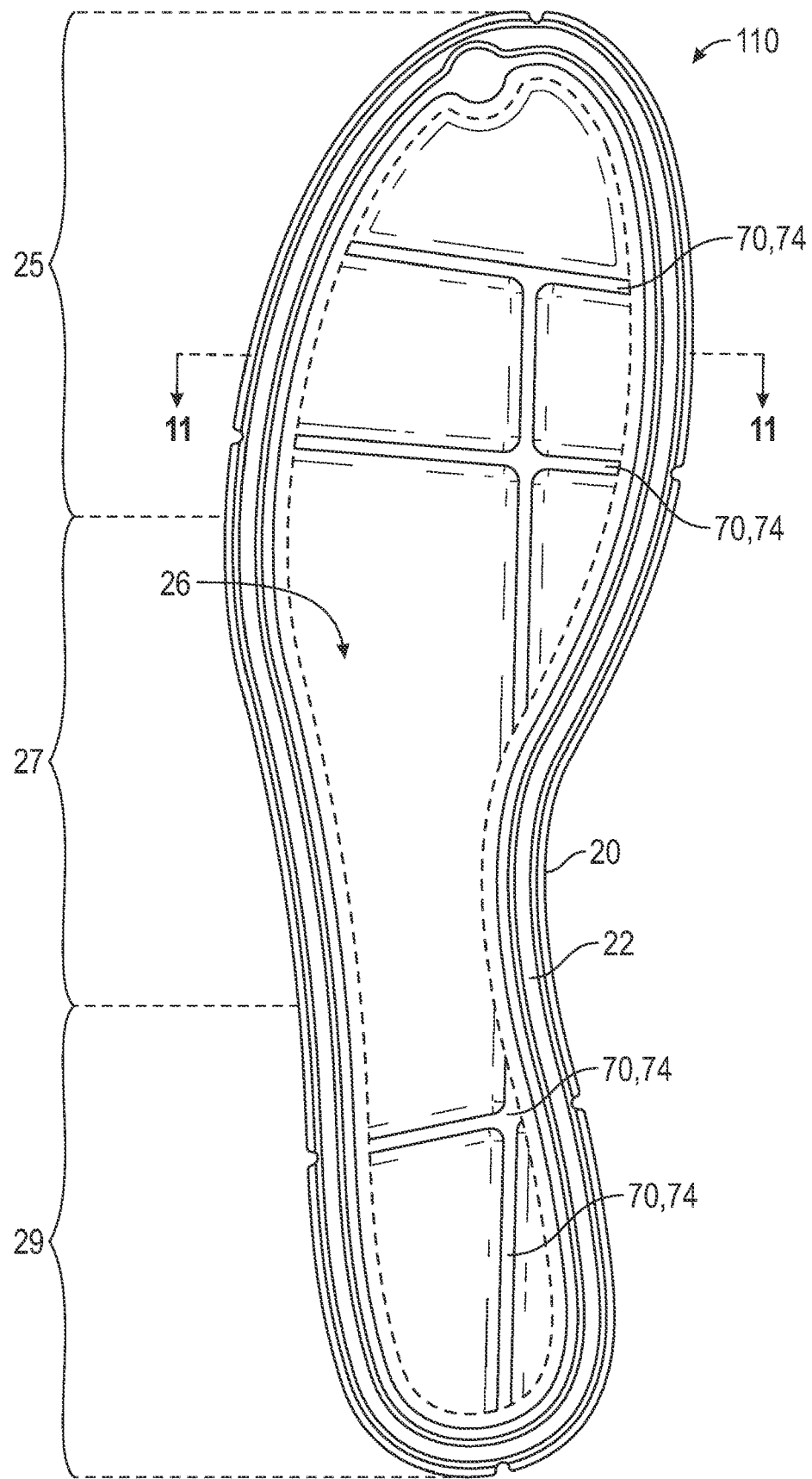
FIG. 10 is a schematic illustration in bottom view of an alternative embodiment of a strobel for an article of footwear.
Figure 11:
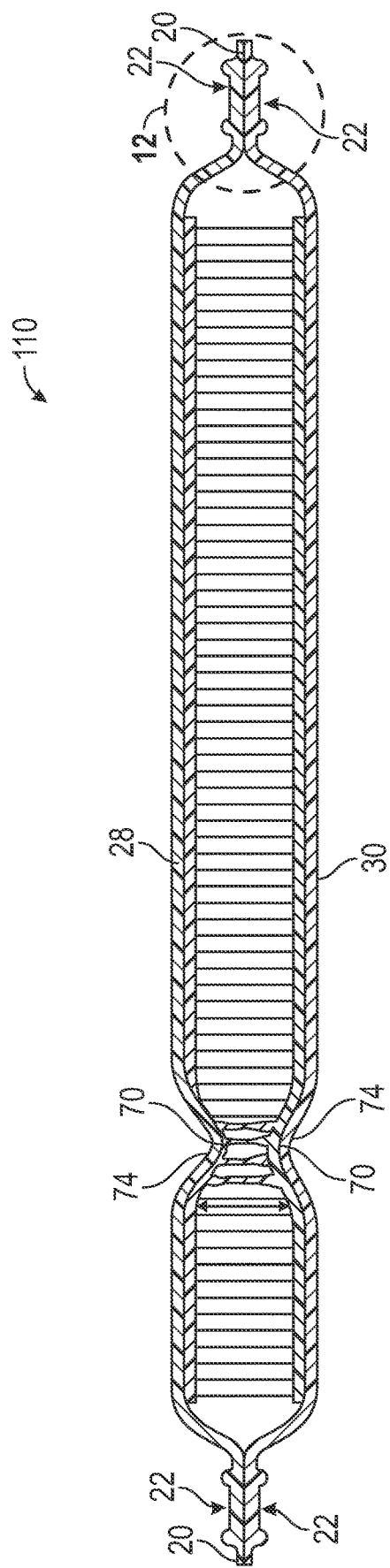
FIG. 11 is a schematic illustration in cross-sectional view of the strobel of FIG. 10 taken at lines 11-11 in FIG. 10.
Figure 12:
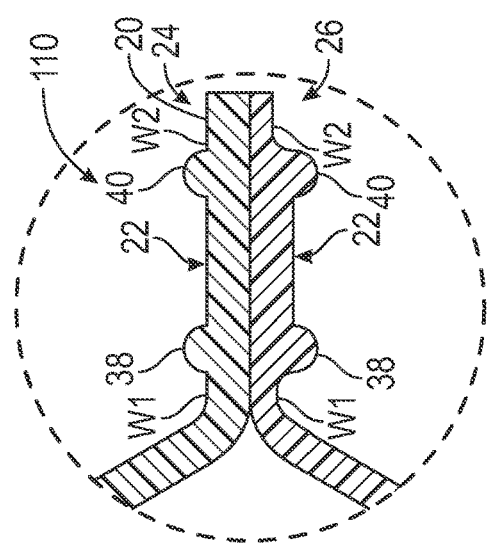
FIG. 12 is a schematic illustration in close-up cross-sectional view of a portion of the strobel of FIG. 11.

In some embodiments, such as on the strobel 10, the groove 22 is in the distal surface 26, which is the ground-facing side of the polymeric bladder 16 when the strobel 10 is secured to the upper 14. In other embodiments, the groove 22 may be on the proximal side (proximal surface 24), which is the foot-facing side of the polymeric bladder 16 when the strobel 10 is secured to the upper 14. Because the polymeric sheets 28, 30 may be transparent, the groove 22 would be visible through the peripheral flange 20 at the distal side in embodiments in which a groove 22 is provided only on the proximal side. In still other embodiments, both the distal surface 26 and the proximal surface 24 have such a groove 22, as shown on the strobel 110 of FIGS. 10-12. The peripheral flange 20 defines an additional groove 22 extending along the proximal surface 24 of the peripheral flange 20. The peripheral flange 20 has an additional first weld W1 and an additional second weld W2 spaced apart from the additional first weld W1 on the proximal surface 24 of the peripheral flange 20. The additional first weld W1 and the additional second weld W2 extend lengthwise along the peripheral flange 20, and the additional groove 22 extends lengthwise along the peripheral flange 20 between the additional first weld W1 and the additional second weld W2. The additional first weld W1 is inward of the additional groove 22, and the additional second weld W2 is outward of the additional groove 22. Heating and pressure of the tooling assembly at the additional welds W1 and W2 may displace some of the material of the first polymeric sheet 28 so that the peripheral flange 20 may include a first ridge 38 protruding at the proximal surface 24 of the peripheral flange 20 between the additional first weld W1 and the additional groove 22, and a second ridge 40 protruding at the proximal surface 24 of the peripheral flange 20 between the additional second weld W2 and the additional groove 22. The ridges 38, 40 help to define the sides of the additional groove 22. Providing both sides of the peripheral flange 20 with a groove 22 helps enable use of the polymeric bladder 16 for an article of footwear configured for a right foot, and also, alternatively, for an article of footwear configured for a left foot. Stated differently, the strobel 110 may be secured to an upper for a right foot article of footwear or may be flipped over for securement to an upper for a left foot article of footwear. In either case, one of the two grooves 22 will be in the same position relative to the upper in both instances (e.g., disposed outward (away from the upper)) to serve as a guide for stitching. In embodiments having a groove 22 on only one of the sides of the peripheral flange 20, because the polymeric sheets 28, 30 may be transparent, the groove 22 would be visible at the distal side even in embodiments in which a groove 22 is provided only on the proximal side and vice versa.

As best shown in FIG. 3, the strobel 10 includes a tensile component 50 disposed in the interior cavity 18. The tensile component 50 is secured to opposing inner surfaces 52, 54 of the polymeric bladder 16. The tensile component 50 includes a first tensile layer 56, a second tensile layer 58, and a plurality of tethers 60 spanning the interior cavity 18 from the first tensile layer 56 to the second tensile layer 58. The tethers 60 connect the first tensile layer 56 to the second tensile layer 58. Only some of the tethers 60 are indicated with reference numbers in FIG. 3. The tethers 60 may also be referred to as fabric tensile members or threads and may be in the form of drop threads that connect the first tensile layer 56 and the second tensile layer 58. The tensile component 50 may be formed as a unitary, one-piece textile element having a spacer-knit textile.

The first tensile layer 56 is bonded to the inner surface 52 of the first polymeric sheet 28, and the second tensile layer 58 is bonded to the inner surface 54 of the second polymeric sheet 30. More specifically, a first surface bond 62 joins the inner surface 52 of the first polymeric sheet 28 to the outer surface 64 of the first tensile layer 56. A second surface bond 66 joins the inner surface 54 of the second polymeric sheet 30 to the outer surface 68 of the second tensile layer 58, opposite the first tensile layer 56. Entire interfacing portions of the surfaces 52, 64 and of the surfaces 54, 68 are bonded to one another.

The tethers 60 restrain separation of the first and second polymeric sheets 28, 30 to the maximum separated positions shown in FIG. 3, which depicts the strobel 10 with the interior cavity 18 inflated and sealed under a given inflation pressure of gas in the interior cavity 18, so that the strobel 10 is in an inflated state. It should be appreciated, however, that, in some embodiments of a method of manufacturing 200 the strobel 10 described herein, the strobel 10 is not inflated and sealed until after it is secured to the upper 14. In other embodiments of the method 200, the strobel 10 may be inflated and sealed before it is secured to the upper 14. The outward force on the first and second polymeric sheets 28, 30 due to the pressurized gas in the interior cavity 18 places the tethers 60 in tension, and the tethers 60 prevent the tensile layers 56, 58 and polymeric sheets 28, 30 from further outward movement away from one another. However, the tethers 60 do not present resistance to compression when under a compressive load. When pressure is exerted on the strobel 10 such as due to compressive forces FC of a dynamic load of a wearer when the footwear 12 impacts the ground during running or other movements, as shown in FIG. 15, the strobel 10 is compressed, and the polymeric sheets 28, 30 move closer together as the tethers 60 collapse (e.g., go slack) in proportion to the load on the first and second polymeric sheets 28, 30 adjacent the particular tethers 60.

Figure 19:
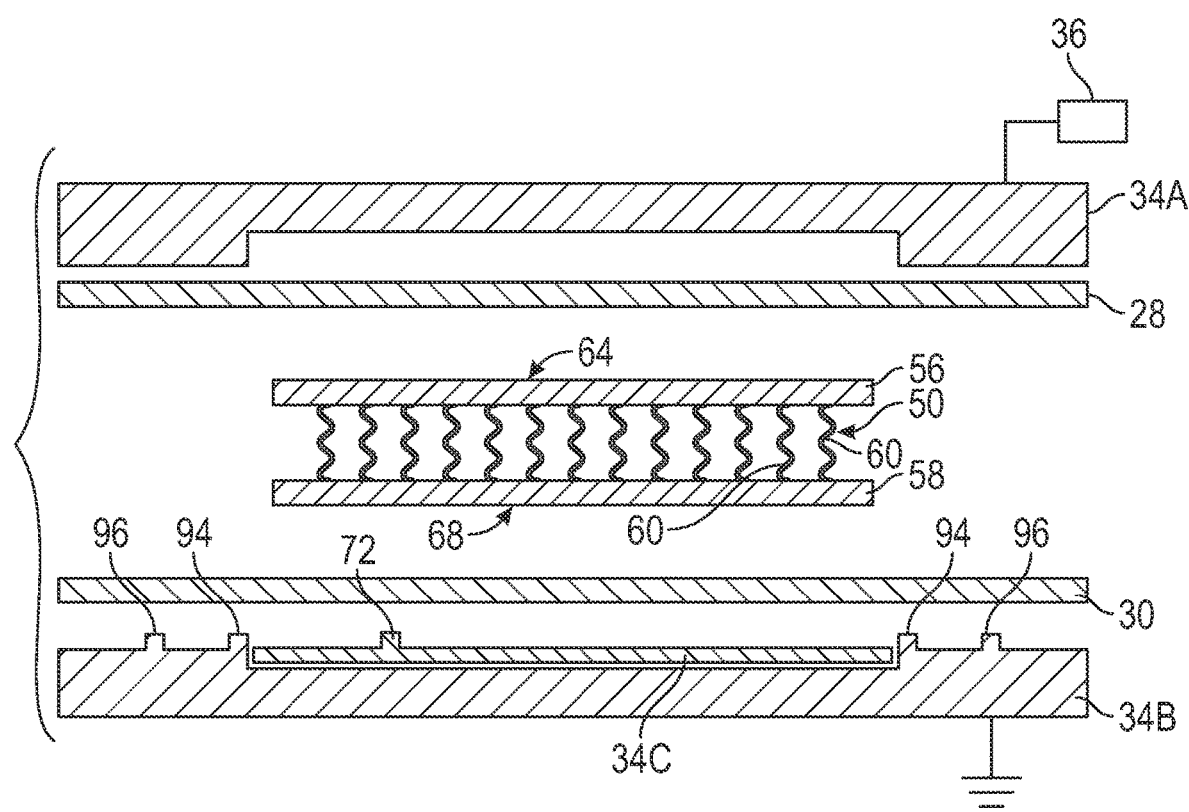
FIG. 19 is a schematic illustration in exploded view of the strobel of FIG. 2 and a tooling assembly.
Figure 20:
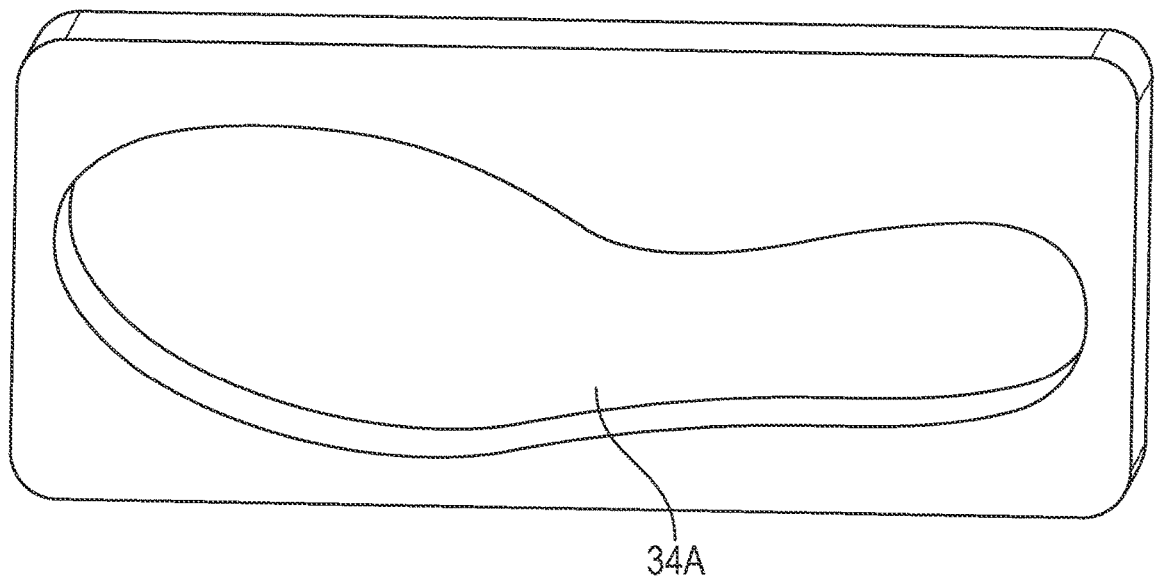
FIG. 20 is a schematic perspective illustration of a portion of the tooling assembly of FIG. 19.

As shown in FIG. 19, prior to bonding the tensile component 50 to the first and second polymeric sheets 28, 30, the tethers 60 of the tensile component 50 may all be initial lengths, and in some embodiments all substantially the same length, and the first and second tensile layers 56, 58 connected by the tethers 60 may have generally flat outer surfaces 64, 68, respectively, directly above the tethers 60. In FIG. 19, the tethers 60 are represented in a slackened state as the tensile component 50 is not within a sealed interior cavity and is not subjected to tension as it is when the strobel 10 is in an inflated state and not under a dynamic compressive load.

Figure 21:
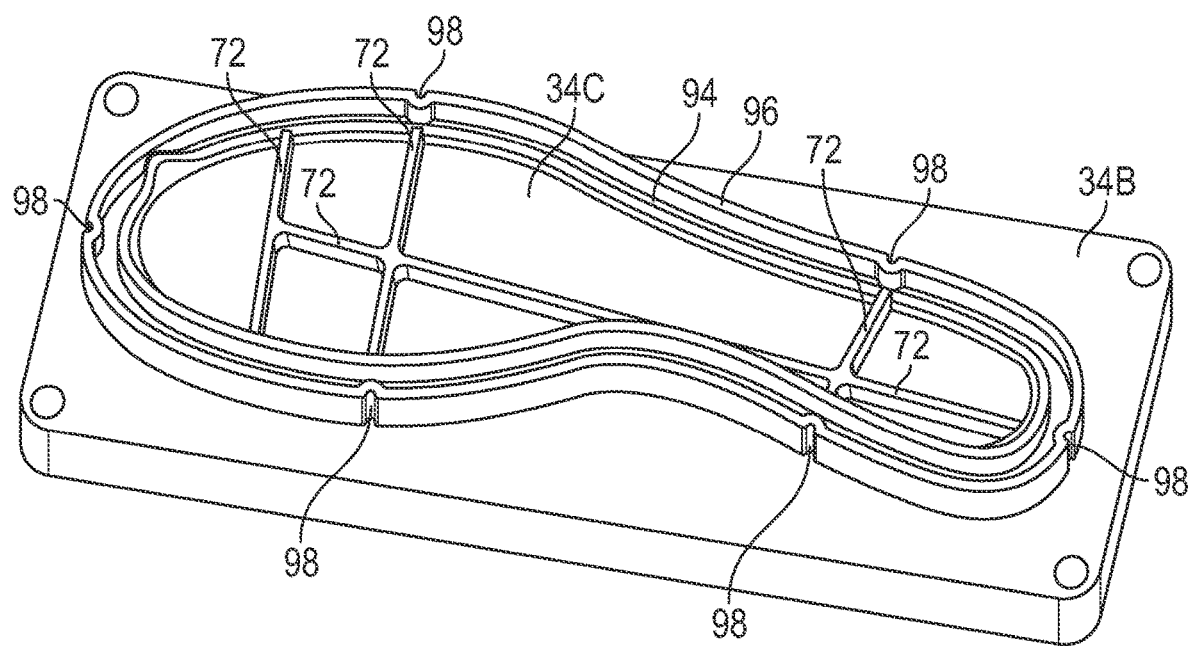
FIG. 21 is a schematic perspective illustration of another portion of the tooling assembly of FIG. 19.

Under the method 200 provided herein, although the tethers 60 are originally of the same length and the outer surfaces 64, 68 of the first and second tensile layers 56, 58 and the surfaces 24, 26 of the first and second polymeric sheets 28, 30, respectively, are originally generally flat directly above the tethers (e.g., not contoured) prior to forming the strobel 10, in some embodiments, the method 200 of manufacturing produces an inwardly-protruding bond 70 that joins the first polymeric sheet 28 to the first tensile layer 56 and protrudes inward from the first polymeric sheet 28 toward the second polymeric sheet 30 directly into a region of the interior cavity 18 occupied by some of the tethers 60. In fact, in FIG. 3, there are multiple inwardly-protruding bonds 70. Each inwardly-protruding bond 70 protrudes farther toward the second polymeric sheet 30 than the first surface bond 62. The plurality of inwardly-protruding bonds 70 protrude inward from the first polymeric sheet 28 only partially across the plurality of tethers 60 toward the second polymeric sheet 30, and the polymeric bladder 16 is narrowed at the inwardly-protruding bonds 70. For example, the bonds may be formed by a welding process, such as radio frequency or ultrasonic welding using tooling that results in thermal bonds in the polymeric bladder 16. Each inwardly-protruding bond 70 results from a respective protrusion 72 of a mold component such as mold insert 34C of FIGS. 19 and 21. The protrusions 72 contact the first polymeric sheet 28 during the method 200 of manufacturing disclosed herein. FIG. 21 shows a representative mold insert 34C having the protrusions 72 in a first pattern that result in the bond pattern of inwardly-protruding bonds 70 at the proximal surface 24 of the strobel 10 shown in FIG. 2, although the mold insert 34C is shown secured to the mold portion 34B for an embodiment in which the welds W1, W2 are on the same side of the bladder 16 as the inwardly-protruding bonds. The mold insert 34C may also be referred to as a shim.

The inwardly-protruding bonds 70 result in depressed grooves 74 at the proximal surface 24 of the first polymeric sheet 28. In the embodiment shown, the inwardly-protruding bonds 70 are only at the first polymeric sheet 28. In other embodiments, such as in the strobel 110 of FIGS. 11 and 12, mold inserts such as mold insert 34C may be placed adjacent both the first polymeric sheet 28 and the second polymeric sheet 30 to also provide inwardly-protruding bonds 70 at the second polymeric sheet 30 as an alternative to or in addition to the inwardly-protruding bonds 70 at the first polymeric sheet 28. In still other embodiments, such as the strobel 10A shown in FIGS. 5 and 6, no inwardly-protruding bonds 70 are formed at either of the first and second polymeric sheets 28, 30.

Each inwardly-protruding bond 70 partially traverses the plurality of tethers 60 as shown in FIG. 3. Stated differently, the inwardly-protruding bonds 70 are directly outward of different ones of the tethers 60 and protrude inward on those tethers 60. The tethers 60 may be arranged in rows, with each row extending transversely between the tensile layers 56, 58, or in any other pattern in which the tethers 60 extend between the tensile layers 56, 58. Various different ones of the tethers 60 are aligned with the inwardly-protruding bonds 70. An inwardly-protruding bond 70 may traverse different rows of the tethers 60 such that different tethers 60 from different rows are aligned with (e.g., under or over) an inwardly-protruding bond 70, or an inwardly-protruding bond 70 may be directly aligned with a single row. Some of the inwardly-protruding bonds 70 could be between rows of tethers.

Because the inwardly-protruding bonds 70 at least partially traverse the plurality of tethers 60, in one or more embodiments and with reference to FIG. 3, the plurality of tethers 60 includes tethers 60A aligned with one of the inwardly-protruding bonds 70 and tethers 60B displaced each of the inwardly-protruding bonds 70. Only some of the tethers 60A, 60B are labelled in FIG. 3. Tethers 60A that are aligned with an inwardly-protruding bond 70 are deformed by heat, by compression of the overlaying of material of the first tensile layer 56, and/or by the overlaying material of the first tensile layer 56 coating the tethers 60A such that the tethers 60A are shorter, thicker, or both shorter and thicker at the inwardly-protruding bonds 70 than elsewhere. Such tethers are indicated with reference numeral 60A in FIG. 3 and may be referred to as modified tethers 60A. However, references to tethers 60 herein include tethers 60A and tethers 60B unless otherwise specified.

Figure 2:
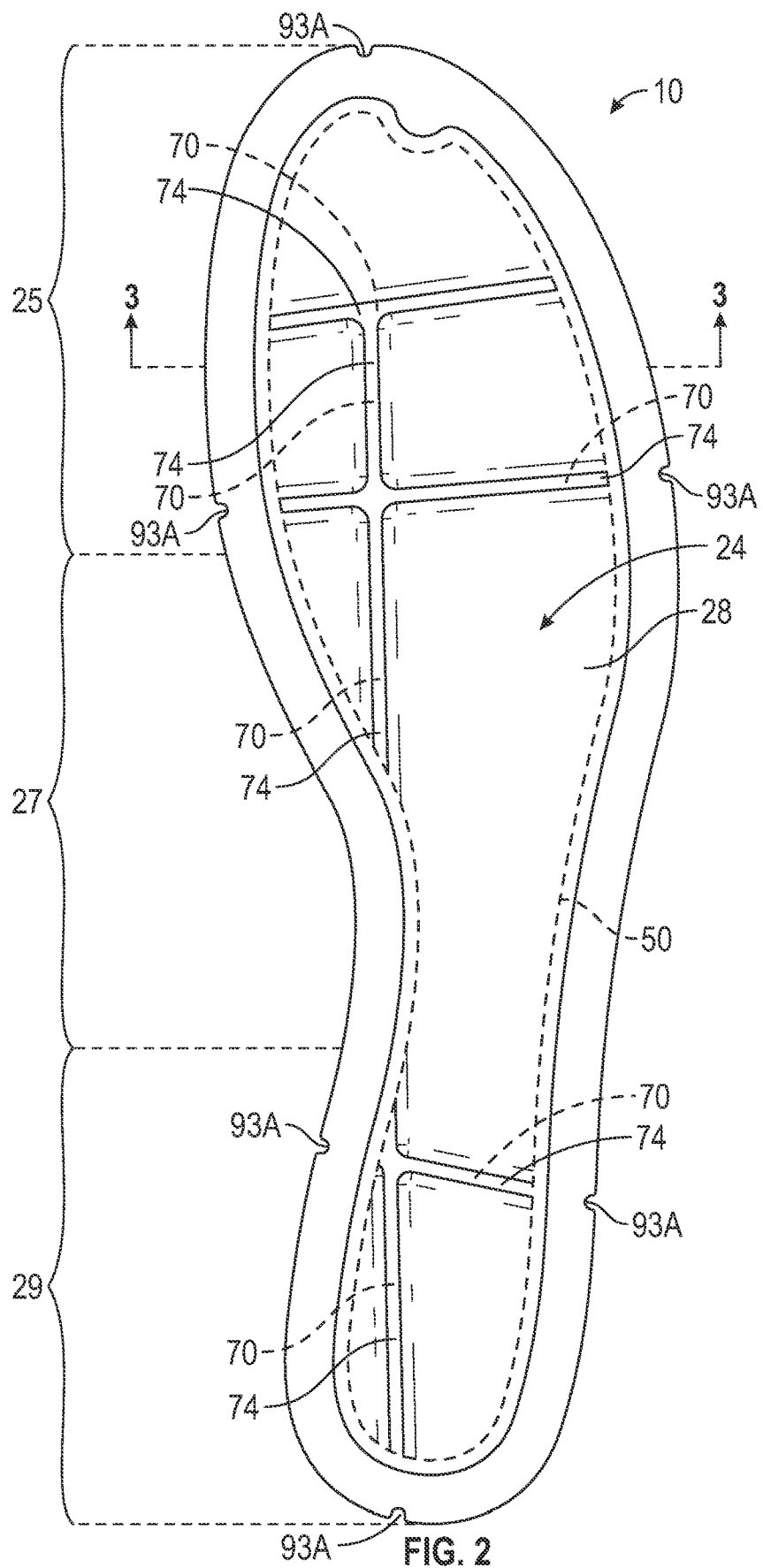
FIG. 2 is a schematic illustration in top view of the strobel of FIG. 1.

When the interior cavity 18 is inflated, the modified tethers 60A result in depressed grooves 74 in the proximal surface 24 of the first polymeric sheet 28 as indicated in FIGS. 2 and 3. When an inflation pressure of the gas in the interior cavity 18 is sufficient to tension the plurality of tethers 60, the inwardly-protruding bonds 70 define grooves 74 at the proximal surface 24 of the first polymeric sheet 28. At each groove 74, the strobel 10 is divided into what may be referred to as a first article portion 11 on one side of the groove 74 and a second article portion 13 on the other side of the groove 74, as indicated in FIG. 3. The first article portion 11 is articulated relative to the second article portion 13 along the groove 74. Stated differently, the proximal surface 24 of the first polymeric sheet 28 at a first side of the inwardly-protruding bond 70 is non-planar with the proximal surface 24 of the first polymeric sheet 28 at a second side of the inwardly-protruding bond 70, the second side being opposite of the first side.

The tension of the modified tethers 60A also causes recesses 76 in the distal surface 26 of the second polymeric sheet 30. The second polymeric sheet 30 is recessed inward toward a corresponding groove 74 and inwardly-protruding bond 70 at each recess 76 when the interior cavity 18 is inflated.

The physical deformation of the first polymeric sheet 28 and the first tensile layer 56 combined with the tension of the modified tethers 60A will cause the grooves 74 to be deeper than the recesses 76, which result only from the tension of the shortened modified tethers 60A. Accordingly, the strobel 10 may have an articulated shape, such as when inflated, not assembled with or constrained by other components, and not under loading, causing the strobel 10 to be slightly concave at the proximal surface 24 and slightly convex at the distal surface 26. The strobel 10 will thus be biased to an articulated shape, as the grooves 74 and recesses 76 together encourage articulation of the strobel 10 to occur at the grooves 74, as the overall thickness of the strobel 10 is reduced at the grooves 74, decreasing bending stiffness of the strobel 10 at the grooves 74.

The grooves 74 act as flexion axes of the strobel 10 thereby increasing flexibility of the sole structure 80 when the strobel 10 is included in the sole structure 80 of the article of footwear 12 as in FIG. 14. The inwardly-protruding bonds 70 and resulting grooves 74 may establish flexion axes, some of which flexion axes may be aligned with joints of the foot, such as the metatarsal phalangeal joints. The flexion axes created by the inwardly-protruding bonds 70 and grooves 74 run laterally and longitudinally along the proximal surface 24, and may increase transverse (i.e., lateral) and longitudinal flexibility of the strobel 10. In one or more embodiments, each of the inwardly-protruding bonds 70 extends generally straight along the proximal surface 24 of the first polymeric sheet 28, and the center axes of the inwardly-protruding bonds 70 are arranged parallel or orthogonal relative to one another at the proximal surface 24 of the first polymeric sheet 28.

Figure 28:
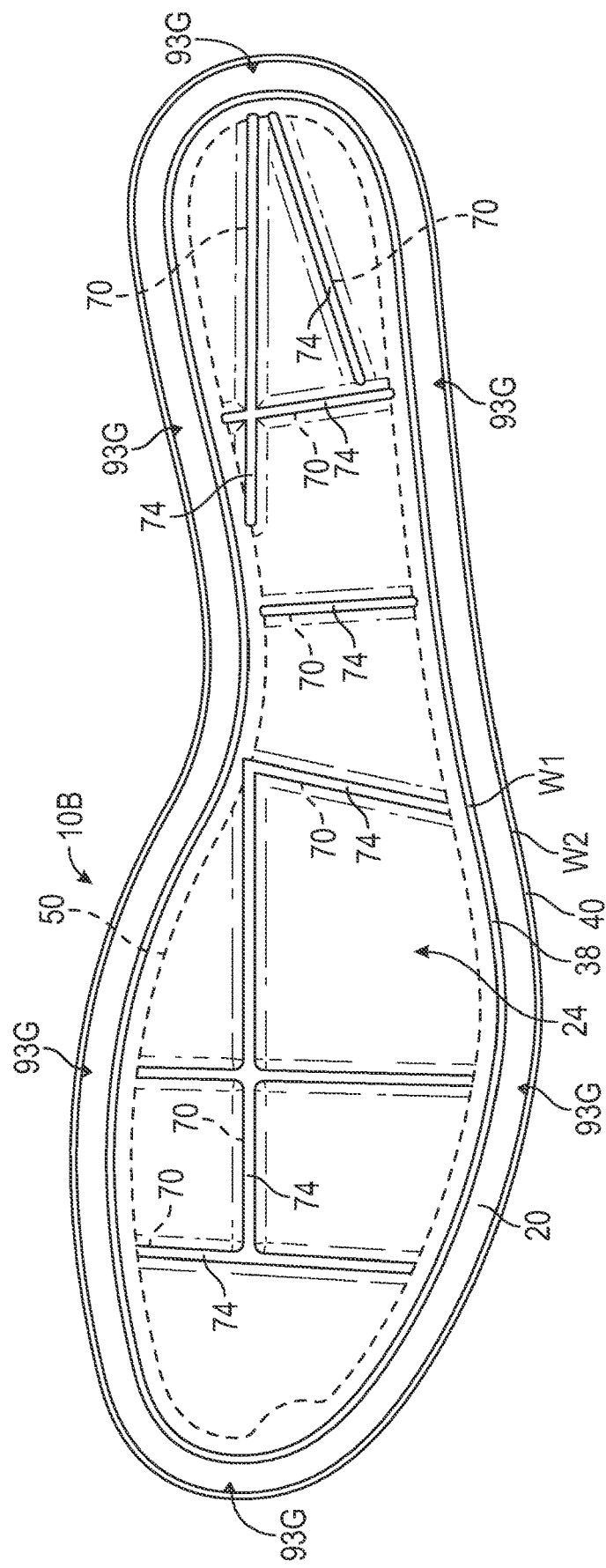
FIG. 28 is a schematic illustration in plan view of an alternative embodiment of a strobel for an article of footwear.

Inwardly-protruding bonds may be arranged in other patterns in other embodiments. For example, providing a mold insert with a different arrangement of protrusions 72 than those shown in FIG. 21 will result in a different pattern of inwardly-protruding bonds 70. One example of an alternative pattern of inwardly-protruding bonds is shown in FIG. 28 as described herein.

Referring to FIG. 3, each inwardly-protruding bond 70 is spaced apart from the second polymeric sheet 30 such that the interior cavity 18 is narrowed but not closed at the inwardly-protruding bond 70, and the gas in the interior cavity 18 can still fluidly communicate across the inwardly-protruding bond 70. The first tensile layer 56 is spaced apart from the second tensile layer 58 by a first distance D1 at the tethers 60B adjacent to the inwardly-protruding bond 70, and the inwardly-protruding bond 70 is spaced apart from the second tensile layer 58 by a second distance D2, which may be the minimum distance between the inwardly-protruding bond 70 and the second tensile layer 58 (i.e., the distance at the most narrowed portion of the interior cavity 18 under the inwardly-protruding bond 70). In an embodiment, the portion 200A of the method 200 of manufacturing may be controlled so that the second distance D2 is between 50 percent and 80 percent of the first distance D1. For example, factors that may influence the inwardly-protruding bond 70 and the extent of its protrusion toward the second polymeric sheet 30 can be controlled to provide this desired ratio of the second distance D2 to the first distance D1. Such factors may include the depth of the protrusion 72 that creates the inwardly-protruding bond 70, the temperature of the mold insert 34C or other mold components, the temperature of the components of the strobel 10, vacuum and/or inflation pressures in the mold cavity during manufacturing, the weld power or weld frequency if radio frequency welding is used, and other factors.

Accordingly, a portion of the interior cavity 18 at a first side of the inwardly-protruding bond 70 is in fluid communication with a portion of the interior cavity 18 at a second side of the inwardly-protruding bond 70, the second side opposite of the first side, as indicated in FIG. 3. The modified tethers 60A shown extending under the inwardly-protruding bond 70 between the two portions are narrow in diameter and allow gas to flow around and between the tethers 60A. This allows the gas to be displaced from the interior cavity 18 at one side of the tethers 60A to the interior cavity 18 at the other side of the tethers 60A when compressive forces FC are applied to the strobel 10, such as during impact of the article of footwear 12 with the ground Gin FIG. 15. For example, as a foot rolls forward from heel to toe during a foot strike, the gas may be displaced from rearward in the strobel 10 to a portion more forward in the strobel 10. Supportive cushioning provided by the fluid in the interior cavity 18 can thus be provided in areas most needed during use of the strobel 10.

Figure 16:
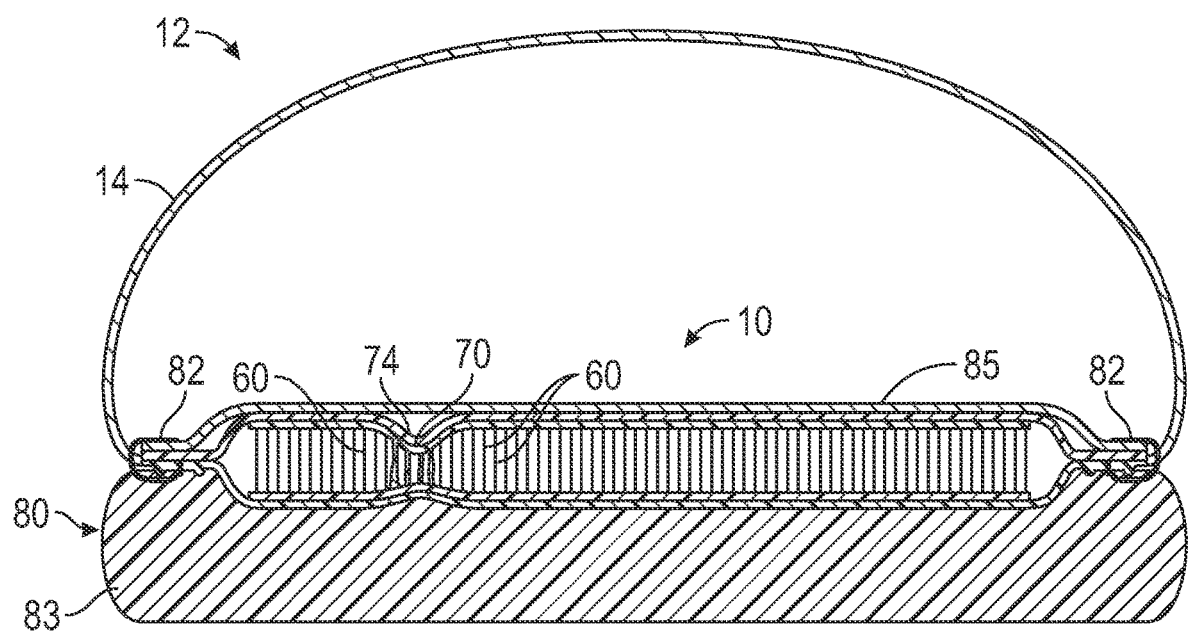
FIG. 16 is a schematic cross-sectional view of the article of footwear of FIG. 14 including an additional layer overlying the strobel.

FIG. 16 shows an embodiment of the footwear 12 in which a protective cover layer 85 is secured over the proximal side of the strobel 10. The protective cover layer 85 will thus be disposed within the foot-receiving cavity 31. The protective cover layer 85 may be an abrasion resistant material to protect the bladder 16 from shear forces and/or from sharp objects. The protective cover layer may be formed from, for example, a polymeric sheet, a fabric layer, or other protective layer that may protect the bladder 16 from shear forces (e.g., by minimizing (or keeping sufficiently low) a coefficient of friction between the abrasion resistant material of the protective cover layer 85 and the bladder 16) in addition to protecting the bladder 16 from sharp objects.

Figure 13:
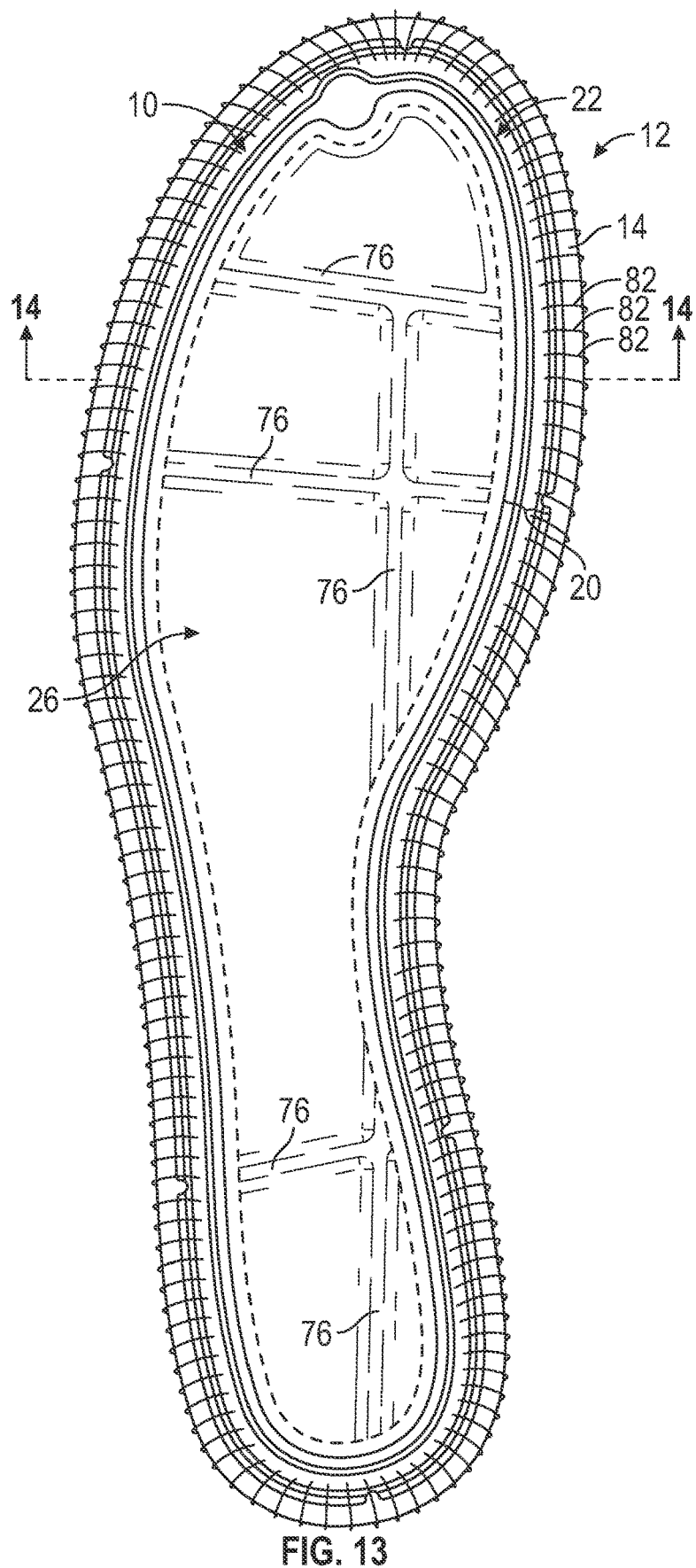
FIG. 13 is a schematic illustration in bottom view of the upper and strobel of FIG. 7.
Figure 23:
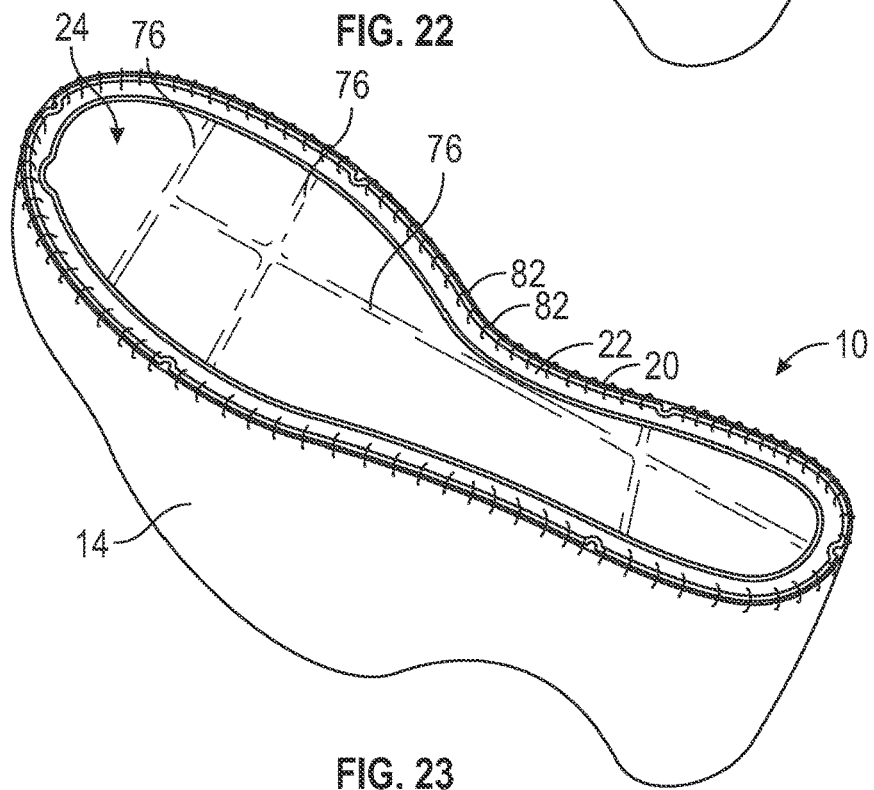
FIG. 23 is a schematic perspective illustration of the strobel and upper of FIG. 7 with the strobel stitched to the upper, and the strobel in an uninflated state.

In one or more embodiments, the strobel 10 is secured to the upper 14 by a series of stitches 82 extending through the peripheral flange 20 in the groove 22, as shown in FIGS. 13 and 23, prior to placing a last 84 in the opening 86 formed by the upper 14. Stated differently, the upper 14 is not placed over the last 84 until after it has been secured to the strobel 10. It is desirable for manufacturing efficiency that securing the strobel 10 to the upper 14 is done accurately and relatively quickly. The groove 22 in the peripheral flange 20 helps to expedite the stitching process by serving as a visual path for the operator and/or a machine to follow during the stitching process.

Although securing the strobel 10 to the upper 14 is not limited to stitching, in FIGS. 7-9, various ways of stitching the strobel 10 to the upper 14 are shown. In FIG. 7, an edge 88 of the upper 14 is abutted against the peripheral flange 20, and the stitches 82 extend through the peripheral flange 20 at the groove 22 (i.e., through both of the polymeric sheets 28, 30 at the peripheral flange 20), and are looped through the upper 14 and around an outer edge 90 of the peripheral flange 20. The strobel 10 is moved relative to the stitching needle, or vice versa so that the needle moves along the groove 22 with the stitches 82 proceeding along the groove 22 and around the polymeric bladder 16.

FIG. 8 shows another stitching arrangement in which the upper 14 is stacked on the peripheral flange 20 on the opposite side of the peripheral flange 20 from the groove 22, and the stitches 82 extend through the upper 14, and both of the polymeric sheets 28, 30 at the groove 22, and proceed along the peripheral flange 20 in the groove 22. FIG. 9 shows another stitching arrangement in which the upper 14 is stacked on the peripheral flange 20 on the same side of the flange 20 as the groove 22, and the stitches 82 extend through the upper 14, and both of the polymeric sheets 28, 30 at the groove 22, and proceed along the peripheral flange 20 in the groove 22.

To further improve the efficiencies of stitching the upper 14 to the strobel 10, in some embodiments, the strobel 10 may be in an uninflated state when the stitching occurs. When in the uninflated state, the strobel 10 is more flexible, making it easier to manipulate the strobel 10 relative to the sewing machine that provides the stitches 82. After the upper 14 is secured to the strobel 10 by the series of stitches 82, the strobel 10 is inflated to a predetermined pressure, or is left at ambient pressure without inflating, and the interior cavity is then sealed by plugging a port or fill tube of the polymeric bladder 16. Inflating and sealing may occur prior to placing the upper 14 with the strobel 10 stitched thereto on the last 84 because, in its inflated state, the strobel 10 and upper 14 are more representative of their final relative configuration and can therefore enable a more accurate placement on the last 84 prior to securing a midsole 83 of the sole structure 80 to the distal surface 26 of the strobel 10 and/or the lower periphery of the upper 14 such as to a lower perimeter of the upper 14.

Figure 17:
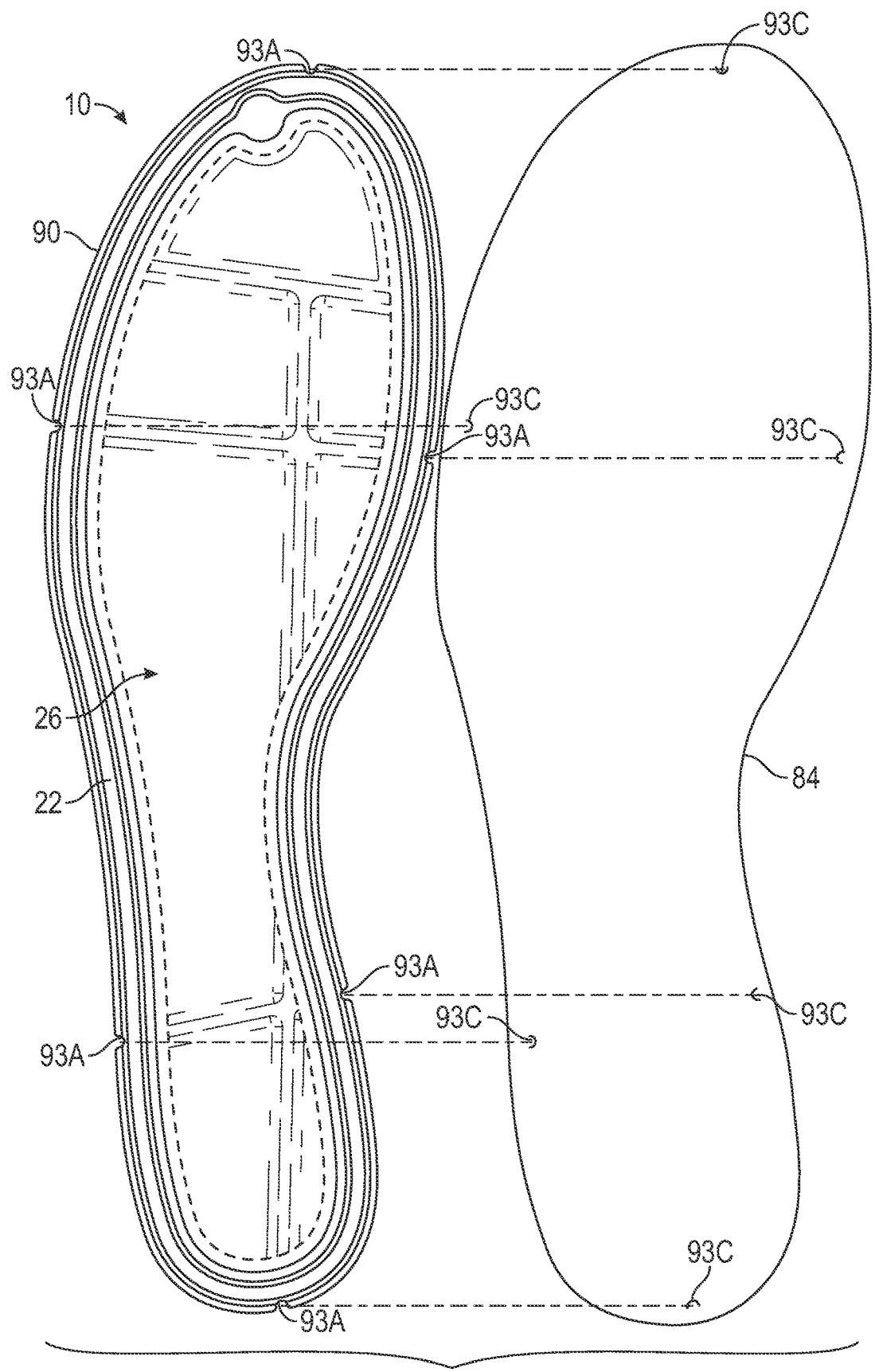
FIG. 17 is a schematic illustration in bottom view of the strobel of FIG. 1 and a last with alignable locating features.

To increase the speed and precision with which the strobel 10 and upper 14 are positioned on the last 84, the strobel 10 may be configured with a locating feature. For example, as shown in FIG. 17, the strobel 10 has notches 93A spaced around the outer edge 90 of the peripheral flange 20. The notches 93A may be formed by the mold portions 34A, 34B or the mold insert 34C. Alternatively, the notches 93A may be cut out of the peripheral flange 20 after it is formed. As shown in FIGS. 19 and 21, the mold portion 34B has continuous inner and outer ridges 94, 96 that are spaced apart from one another, and together create the welds W1 and W2. The outer ridge 96 has notches 98, best shown in FIG. 21, that at least partially form the notches 93A of the strobel 10. In the embodiment of the strobel 10A shown in FIG. 5, the flange 20 has locating features 93H that are protrusions at the outer edge 90 of the peripheral flange 20. In other embodiments, a combination of notches and protrusions, or other markings may be used. In general, the various locating features described herein may be provided, for example, by welding, cutting, punching, printing, dyeing, etc. Still further, lasers could be used to align features of the strobel 10, 10A, or 110 with the last 84. The strobel 10 could be aligned with the perimeter of the upper 14 using a separate jig. In some embodiments, the heel center (at the edge of the peripheral flange) could be aligned with a feature on the last. Additionally, in some embodiments, a pattern could be printed on the strobel 10, 10A, or 110 that can then be aligned with a pattern on the last 84. For example, the distal side of the strobel 10 could have an alignment pattern printed on it, as this side will be adhered to the midsole 83 so that the printed pattern will not be visible in the finished article of footwear. The strobel 310 shown and discussed with respect to FIGS. 30-32 includes such a printed alignment pattern. The printed alignment pattern may also be used for alignment with corresponding alignment features of the upper 14 in some embodiments. In addition to promoting flexibility of the polymeric bladder 10, 10B, etc., the weld pattern of the inwardly-protruding bonds 70 (e.g., the pattern of the resulting grooves 74 and recesses 76) may be used for alignment with the last 84 and/or the upper 14 just as the printed alignment pattern of the embodiments of FIG. 30 or 32 can be used for alignment purposes.

Figure 22:
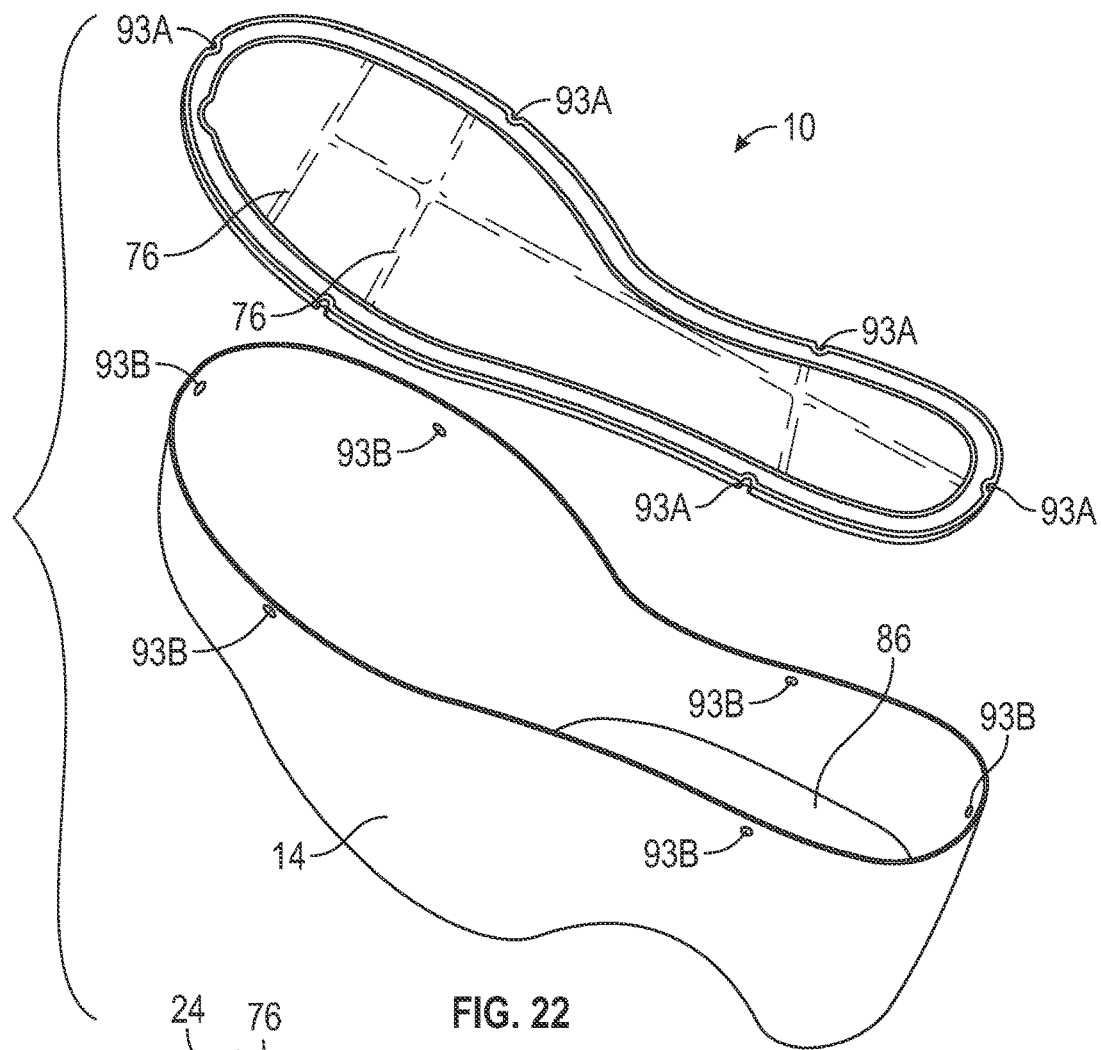
FIG. 22 is a schematic perspective illustration in exploded view of the strobel and upper of FIG. 7 before the strobel is stitched to the upper.

The upper 14 may have locating features that are spaced markings or apertures along its lower periphery that is stitched to the strobel 10. The locating features of the upper 14 have a relative spacing identical to that of the locating features (e.g., the notches 93A) of the strobel 10. During stitching, the operator can align the locating features of the upper 14 with those of the strobel 10 so that they are properly aligned when stitching along the groove 22. In FIG. 22, the upper 14 is shown with locating features (e.g., markings or apertures 93B) that can be aligned with locating features (e.g., notches 93A) of the strobel 10 for this purpose.

Figure 18:
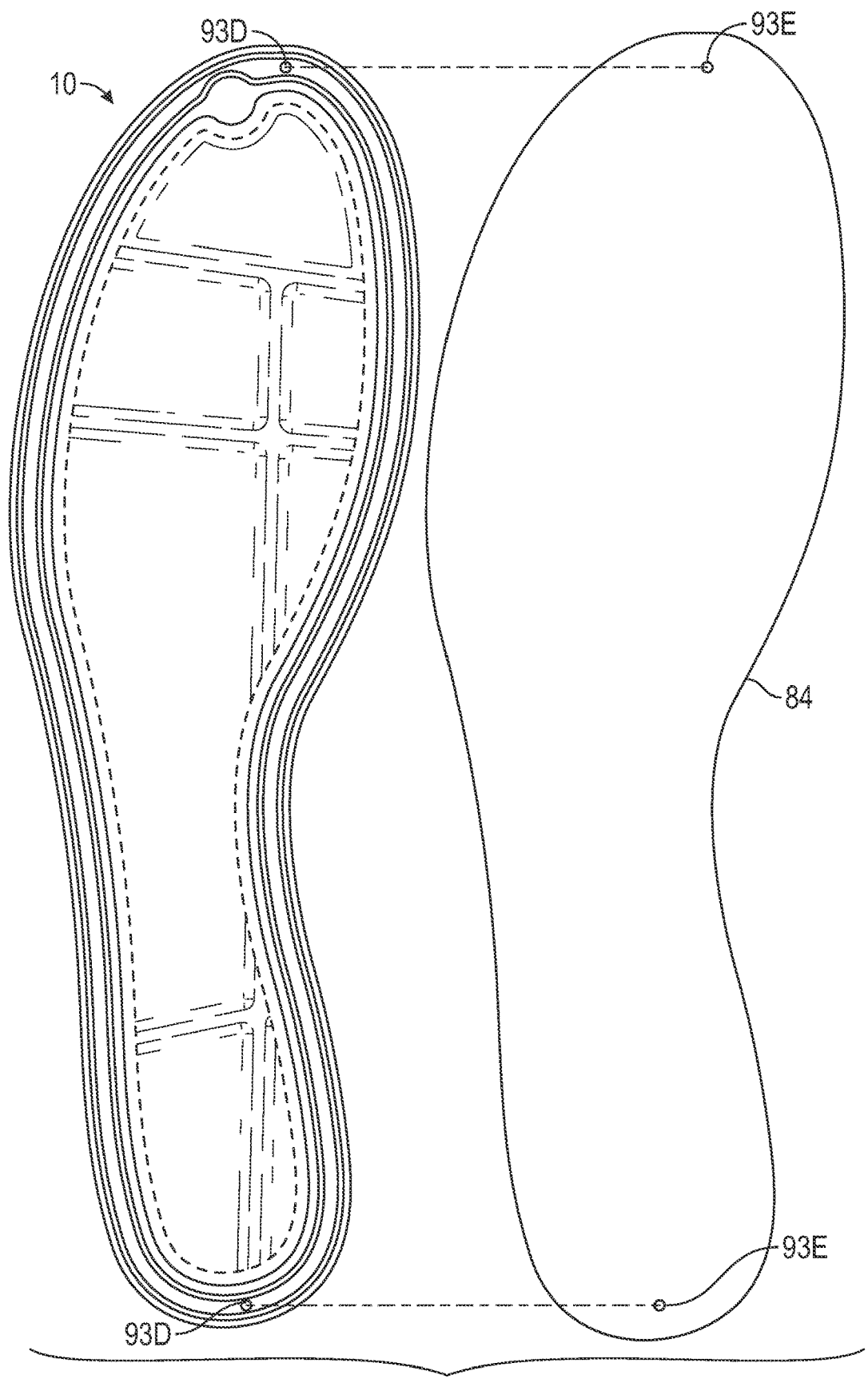
FIG. 18 is a schematic illustration in bottom view of the strobel of FIG. 1 and a last with alternative alignable locating features.
Figure 26:
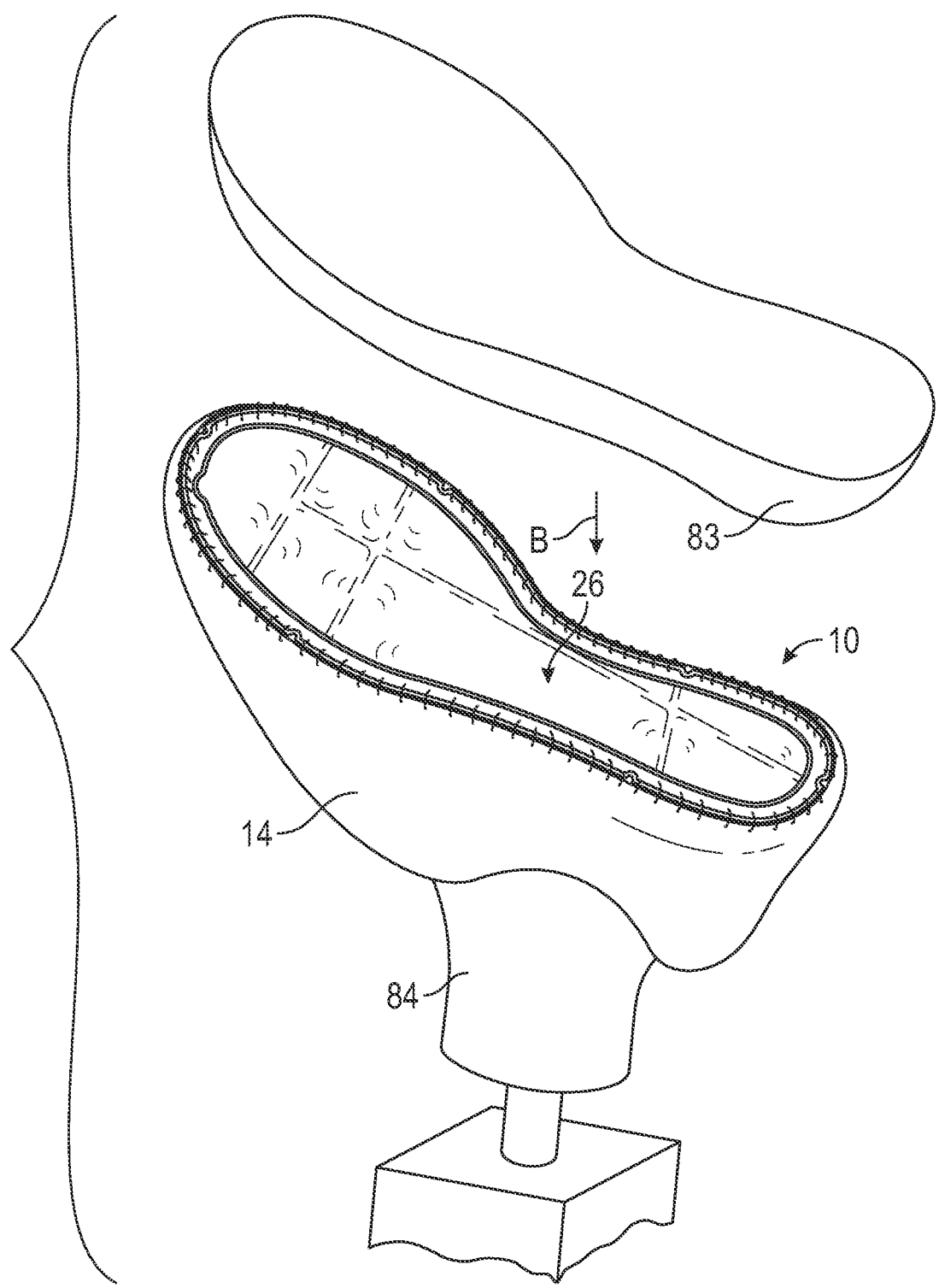
FIG. 26 is a schematic illustration of the strobel and upper of FIG. 25 on the footwear last and with the midsole of FIG. 14 being moved toward the strobel for securement to the strobel and the upper.
Figure 27:
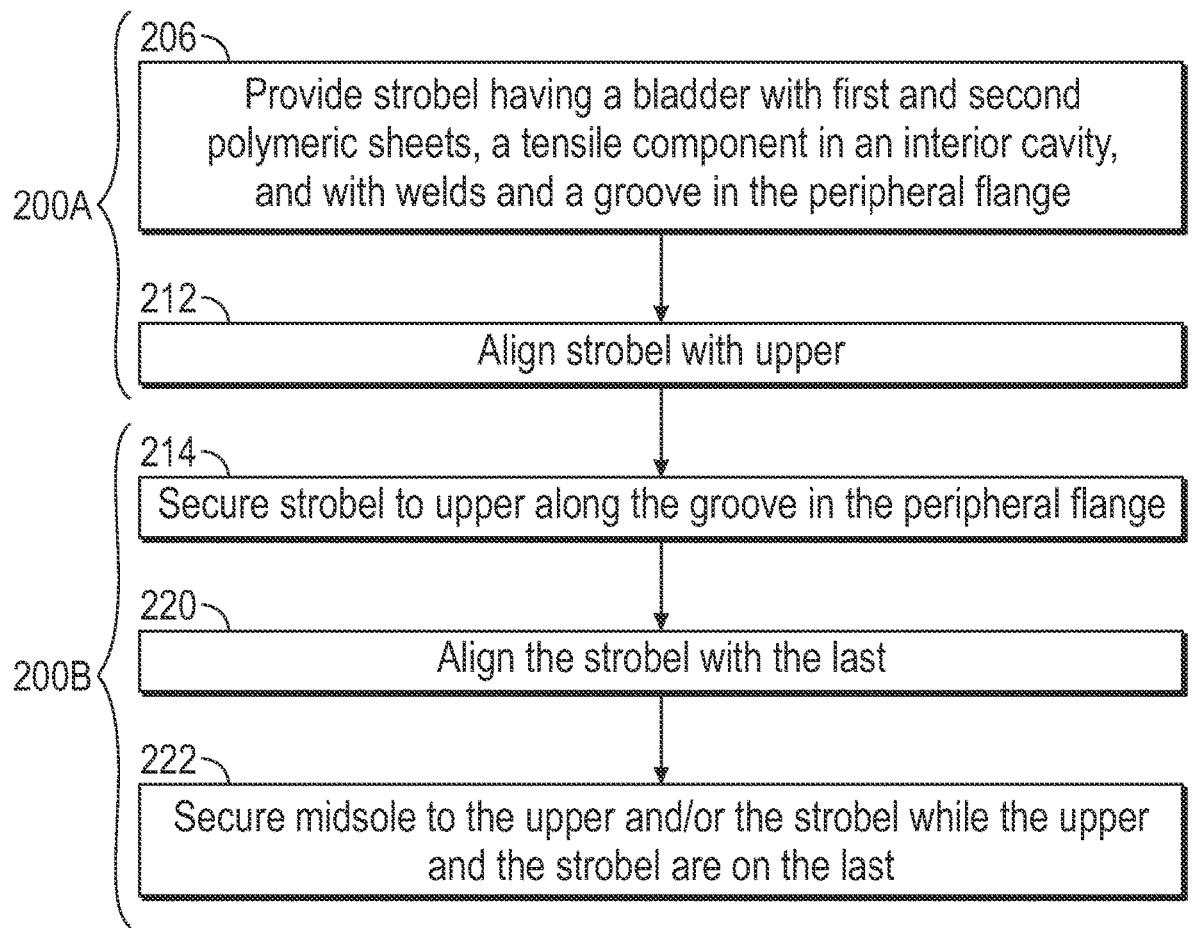
FIG. 27 is a flow diagram of a method of manufacturing footwear.

Alternatively, or in addition, the last 84 can be configured with locating features that have the same relative spacing as the locating features of the strobel 10. As shown in FIG. 17, the locating features 93C may be, for example, markings on or apertures in the last 84. In FIG. 17, the upper 14 is not shown for clarity. FIG. 18 shows another embodiment in which locating features 93D of the strobel 10 are apertures or markings (either represented by the circles near the forward most part of the forefoot region of the strobel and near the rearmost part of the heel region of the strobel). The last 84 has locating features 93E that are markings or apertures that are spaced at the same relative spacing as the locating features 93D. In another embodiment, the last 84 could have markings that align with the weld pattern (e.g., the pattern of inwardly-protruding bonds 70) of the strobel. It should be appreciated that the locating features on the strobel 10 have a slightly different relative spacing when the strobel 10 is in the uninflated state than when the strobel 10 is in the inflated state. Accordingly, the locating features on the strobel 10 may have a relative spacing in the inflated state that is identical to the relative spacing of the locating features on the last 84 if the strobel 10 is secured to the upper 14 when in the uninflated state and is placed on the last 84 when in the inflated state, as described herein The steps of the method 200 of manufacturing footwear according to the flowchart of FIG. 27 are depicted in FIGS. 19 and 22-26. Portion 200A of the method 200 includes the step 206 of providing the strobel. Providing the strobel may include forming the strobel. In other embodiments of the method 200, the strobel 10, 10A, 110, 310, etc., may be already in a formed state when provided in step 206 (e.g., the strobel may be obtained in a formed state under step 206). Accordingly, the entity providing the strobel may both form the strobel and assemble it in the footwear, or a separate entity may form the strobel and the entity carrying out the method 200 may obtain the formed strobel to carry out the method 200. The providing step 206 thus may or may not include forming the strobel.

In embodiments that include forming the strobel, step 206 may include a sub-step in which the second polymeric sheet 30 is placed on the tensile component 50. In other words, the tensile component 50 is between the polymeric sheets 28, 30.

Next, the step 206 may include a sub-step in which the first and second polymeric sheets 28, 30 are welded together at the first and second welds W1, W2 in the peripheral flange 20 to form the polymeric bladder 16 with the interior cavity 18, and, because the welds W1, W2 create the ridges 38, 40, the groove 22 is formed in the peripheral flange 20. As previously discussed, the welding may be radio frequency welding accomplished when the mold portions, such as mold portions 34A, 34B (and mold insert 34C), are closed together on the polymeric sheets 28, 30 and a power source 36 supplies energy creating an alternating electric field that heats the polymeric sheets 28, 30, creating welds where the mold portions 34A, 34B and/or mold insert 34C are applied to the polymeric sheets 28, 30.

Separately or simultaneously with welding the welds W1, W2, the portion 200A of the method 200 may include a sub-step of welding the inwardly-protruding bonds 70 by the radio frequency welding via the protrusions 72 of the mold insert 34C. For example, the inwardly-protruding bonds 70 will be provided simultaneously with the welds W1, W2 if the mold insert 34C is positioned in the mold cavity formed between the mold portions 34A, 34B when the mold portions 34A, 34B are closed together.

Figure 30:
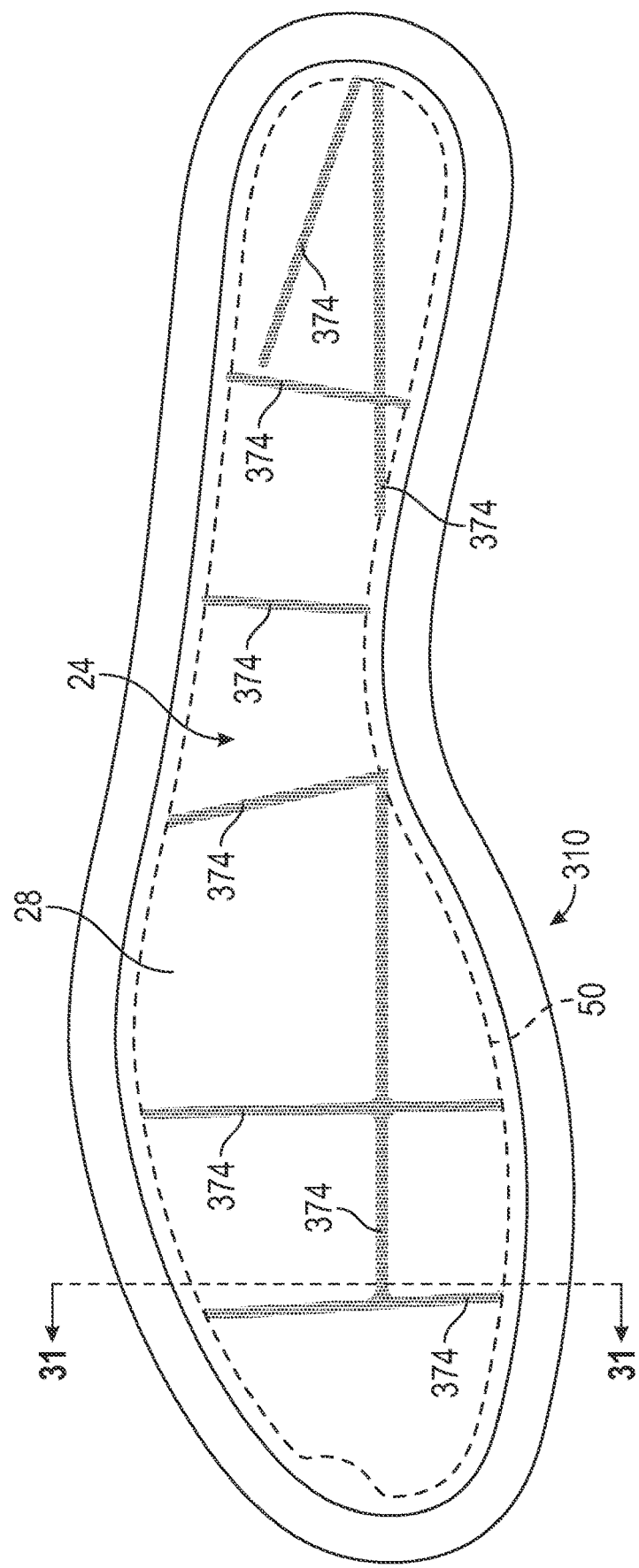
FIG. 30 is a schematic illustration in top view of an alternative embodiment of a strobel for an article of footwear.
Figure 31:
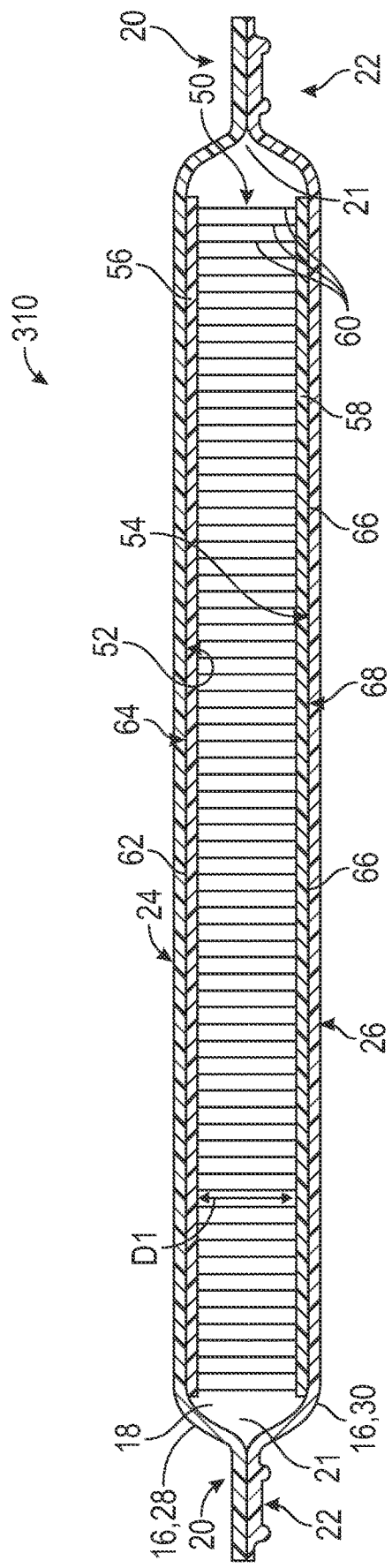
FIG. 31 is a schematic illustration in cross-sectional view of the strobel of FIG. 30 taken at lines 31-31 in FIG. 30.
Figure 32:
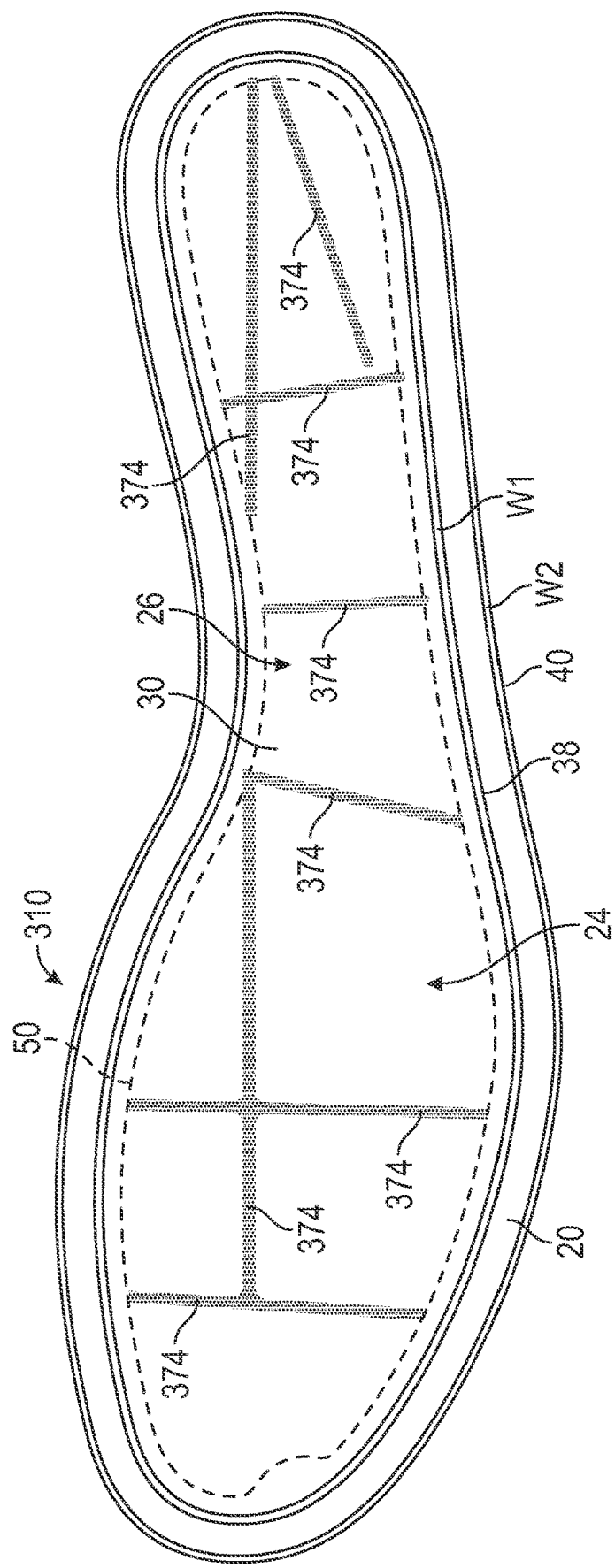
FIG. 32 is a schematic illustration in bottom view of the strobel of FIG. 30.

The portion 200A of the method 200 may include a step in which one or more locating features are provided on the strobel 10, such as notches 93A, protrusions 93F (see, e.g., strobel 10A), a weld pattern (e.g., the pattern of inwardly-protruding bonds 70) or markings (e.g., a printed pattern of alignment lines 374 in the strobel 310 of FIGS. 30-32) or apertures, both represented as locating features 93D. In some embodiments, the locating features may be provided during the radio frequency welding included in step 206 of providing the strobel as described. Alternatively, the notches 93A, protrusions 93F, or the apertures 93D could be cut, punched, printed, welded, or otherwise formed in a separate subsequent step.

After completing the portion 200A of the method 200 of manufacturing a strobel, the method 200 may proceed to the portion 200B of the method 200. In step 212 of the portion 200B of method 200, the strobel 10, 10A, 110, 310 may be aligned with the upper 14, such as by aligning locating features (e.g., notches 93A or protrusions 93F, the pattern of inwardly-protruding welds 70, or printed alignment lines 374) of the strobel 10, 10A, 310, etc., with locating features (e.g., apertures or markings 93B) of the upper 14. Next, in step 214, the strobel 10 may be stitched to the upper 14 by the series of stitches 82 along the groove 22 in the peripheral flange 20. A tool may then be rolled over the stitches to straighten the stitches.

Figures 24, 25:
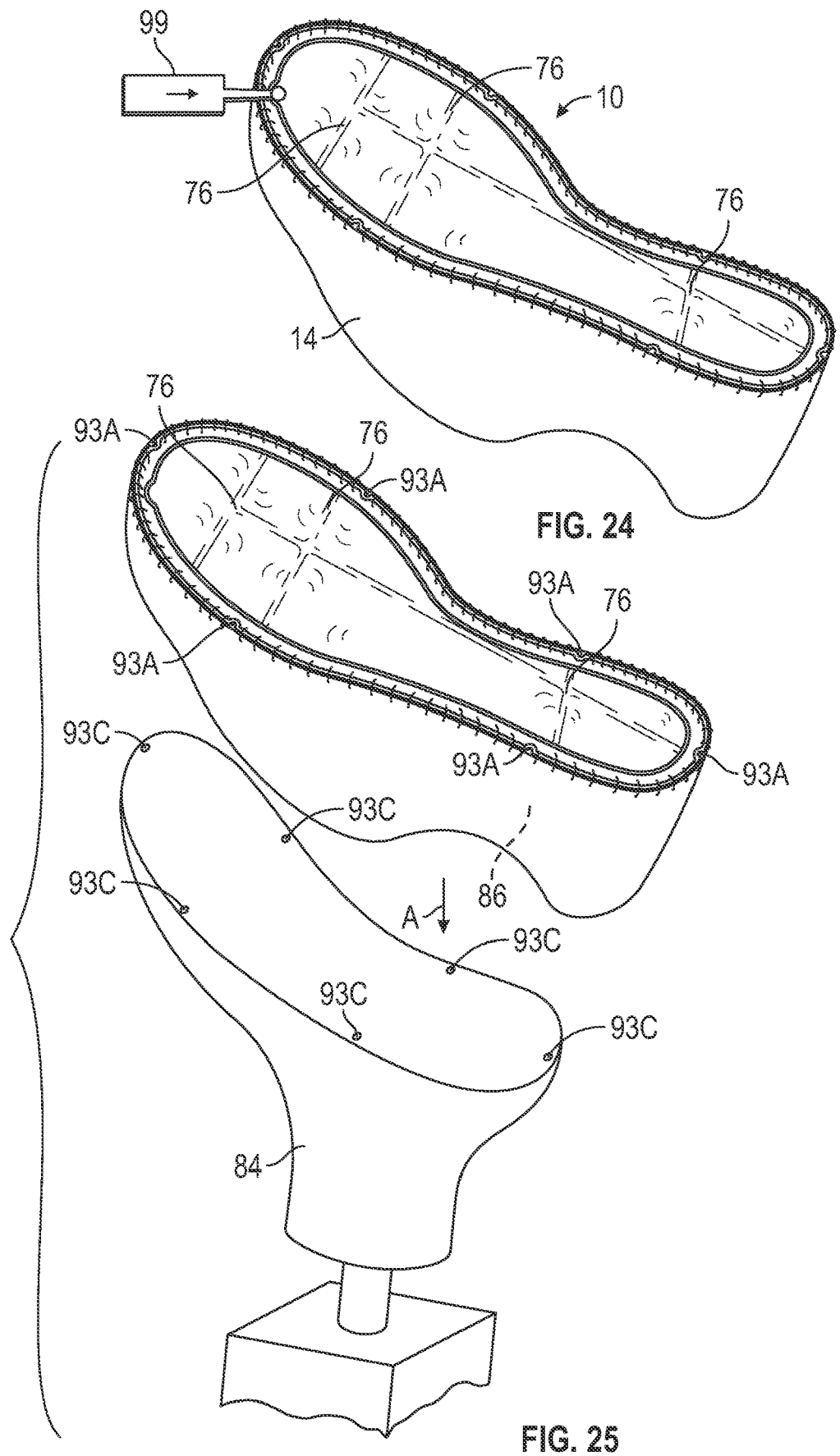
FIG. 24 is a schematic illustration of the strobel and upper of FIG. 23 during inflation of the strobel.
FIG. 25 is a schematic illustration of the strobel and upper of FIG. 24 being moved toward a footwear last.

Prior to or contemporaneously with step 214, a protective cover layer 85 may be secured over the strobel 10 such as by stitching. In an example embodiment, the protective cover layer 85 may be secured to the strobel 10 only at the flange 20, for example, with stitching at or near stitching 82. The stitching may be computer stitching or may be hand stitching. Next, the portion 200B of the method 200 may proceed to an inflation step, in which the polymeric bladder 16 is inflated as shown in FIG. 24, such as by a source 99 of pressurized fluid, which may be nitrogen, air, or another gas. The portion 200B of method 200 may then proceed to a sealing step, in which the interior cavity 18 is sealed by sealing an inflation port or other opening in the polymeric bladder 16 to retain the fluid in the interior cavity 18. Alternatively, if it is desired that the polymeric bladder 16 is at ambient pressure when the footwear 12 is assembled, the portion 200B of method 200 may skip the inflating step. An ambient polymeric bladder 16 may even be sealed by the welding of step 206, in which case the portion 200B of the method 200 may also skip the sealing step. In other embodiments, the bladder 16 may already be inflated before the portion 200B of the method 200 begins (e.g., the bladder 16 may already be inflated and sealed when provided under step 206).

The upper 14 with the strobel 10 stitched thereto may then be placed on the last 84. This may be by placing the last 84 into the opening 86 of the upper 14, or moving the upper 14 over the last 84 so that the last 84 is in the opening 86, as represented by FIG. 25 in which the upper 14 and strobel 10 are moved in the direction of arrow A. In step 220, which may occur simultaneously with placing the strobel 10 on the last 84 or may be by subsequent adjustment of the strobel 10 on the last 84, the one or more locating features (e.g., notches 93A, protrusions 93F, pattern of inwardly-protruding bonds 70, printed alignment lines 374, or markings or apertures 93D) of the strobel 10, 10B, or 310 are aligned with corresponding one or more locating features (e.g., markings or apertures 93C or 93E) of the last 84, as described with respect to FIGS. 17 and 18, for example. There may be some predetermined tolerance range of the locating features on the last 84, such as by making the locating features on the last 84 larger than those on the strobel 10, so that as long as the locating features of the strobel 10 to some extent overlap the locating features of the last 84, the components are considered to be sufficiently accurately aligned. If the locating features of the strobel 10 and the last 84 are not sufficiently aligned, however, the upper 14 with strobel 10 may be removed and then placed again onto the last 84 to see if better alignment can be achieved. If not, the strobel 10 and upper 14 are considered to be outside of the assembly tolerance range and may be recycled.

If step 220 is completed with the locating features of the strobel 10 and the last 84 successfully aligned, then the portion 200B of method 200 may proceed to step 222, and the midsole 83 may be secured to the upper 14 and/or the strobel 10. This may occur while the upper 14 and strobel 10 are on the last 84. This is depicted in FIG. 26 by the movement of the midsole 83 in the direction of arrow B toward the strobel 10 and the upper 14. Adhesive may be applied to the midsole 83 and or to the strobel 10 and upper 14 where they interface with the midsole 83 to secure the midsole 83 to the upper 14, and/or the midsole 83 may be in a heated state that causes it to thermally bond to the strobel 10 and upper 14. In some embodiments, the assembled components may then be heated by placing them in a heater to activate the adhesive. An outsole or any other components of the sole structure 80 (not shown) may also secured to the midsole 83 or to the upper 14, and then the method 200 is complete.

FIG. 28 shows another embodiment of a strobel 10B that is alike in all aspects to strobel 10 except that inwardly-protruding bonds 70 are arranged in a different pattern. The strobel 10B is formed from first and second polymeric sheets with a tensile component 50 disposed between the sheets in a sealed interior cavity, and connecting inner surfaces of the sheets, as described with respect to strobel 10. As can be seen, some of the inwardly-protruding bonds 70 in the forefoot region are arranged parallel to one another and perpendicular to a longitudinally-extending one of the inwardly-protruding bonds 70. In the heel region, the inwardly-protruding bonds 70 are arranged to diverge from one another at an acute angle in a forward direction from a rear of the heel region. The inwardly-protruding bonds 70 result in a pattern of grooves 74 at the exterior surface of the strobel 10B that may enhance flexibility of the strobel 10B and may be used for alignment with the last 84 and/or the upper 14 as discussed herein. As shown, the inwardly-protruding bonds 70 extend downward from the proximal surface 24 of the strobel 10B. In other embodiments, the surface identified in FIG. 28 as the proximal surface could instead be the distal surface. For example, the strobel 10B resulting from the mold assembly of FIG. 29 could be used as a right-foot strobel with the inwardly-protruding bonds 70 extending downward from the proximal surface 24, or as a left-foot strobel with the inwardly-protruding bonds extending upward from the distal surface. The strobel 10B can be formed as described with respect to method 200 and can be used in the method of manufacturing footwear in the same manner as described with respect to strobel 10.

Figure 29:
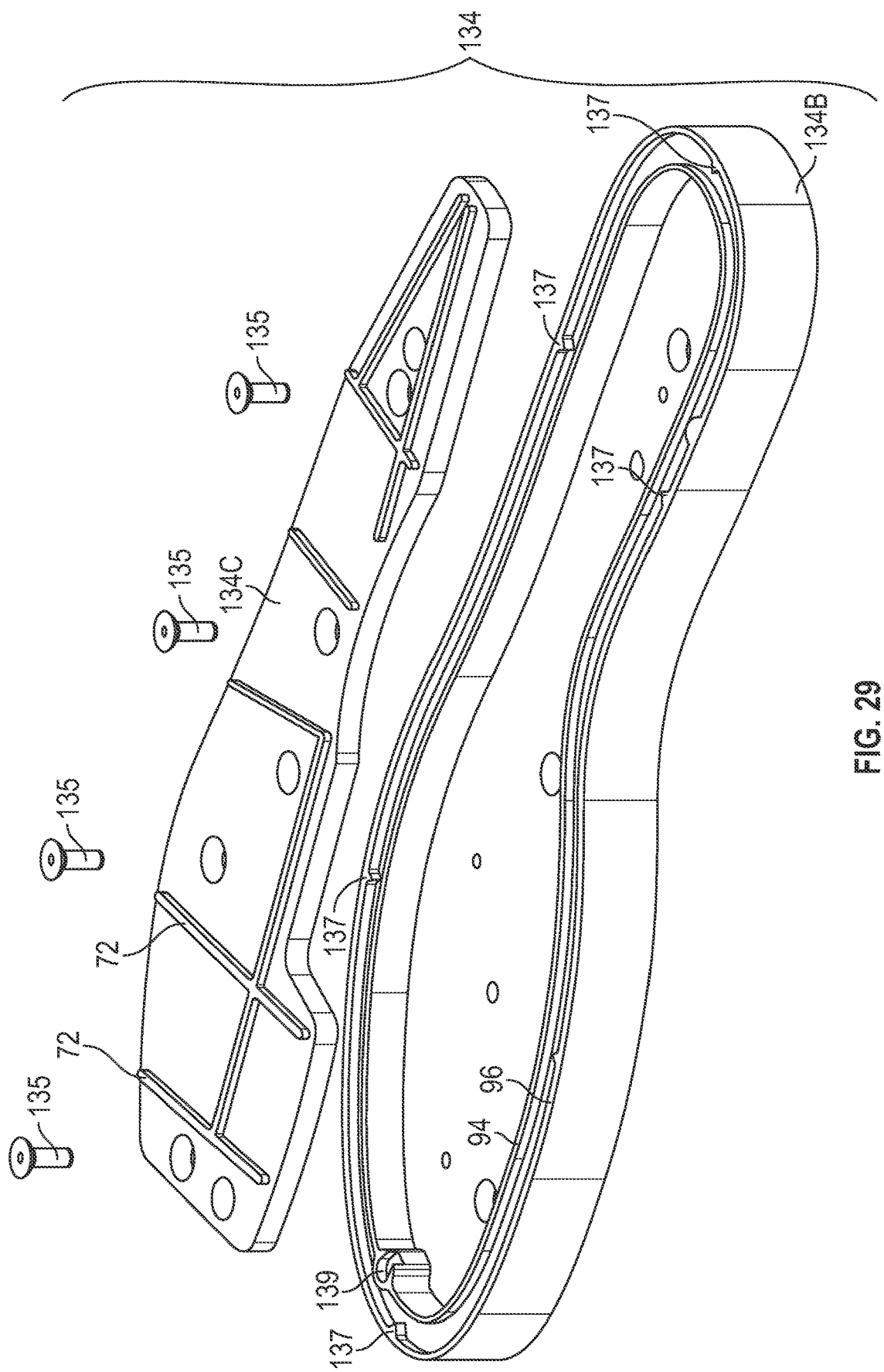
FIG. 29 is a schematic illustration in exploded view of a tooling assembly for the strobel of FIG. 28.

FIG. 29 shows a portion of a tooling assembly that includes mold portion 134B and mold insert 134C. Fasteners 135 extend through openings in the mold insert 134C and into the mold portion 134B to secure the mold insert 134C to the mold portion 134B. An additional mold portion similar to mold portion 34A is closed together with mold portion 134B on the polymeric sheets 28, 30, with the tensile component 50 between the polymeric sheets 28, 30. The polymeric sheets 28, 30 and tensile component 50 are then welded by radio frequency welding (also referred to as high frequency or dielectric welding) or are secured by another manner of thermal or adhesive bonding, as a power source 36 supplies energy creating an alternating electric field that heats the polymeric sheets 28, 30 where the mold portions 34A, 134B or mold insert 134C are applied to the polymeric sheets 28, 30.

In the tooling assembly of FIG. 29, the ridges 94, 96 of the mold portion 134B are applied to the same sheet as the protrusions 72 of the mold insert 134C. Accordingly, the welds W1, W2 are on the same side of the strobel 10B as are the inwardly-protruding bonds 70. Extensions 137 at the periphery of the mold portion 134B result in triangular markings (e.g., indentations) 93G in the flange 20 of the strobel 10B. These markings can be used as locating features when aligning the strobel 10B with the upper 14 and/or with the last 84. In some embodiments, the flange 20 can be trimmed at these markings to create apertures that serve as locating features. The mold portion 134B also includes structure 139 that molds an inflation port into the strobel 10B that can be sealed after inflating the strobel 10B.

Figure 5:
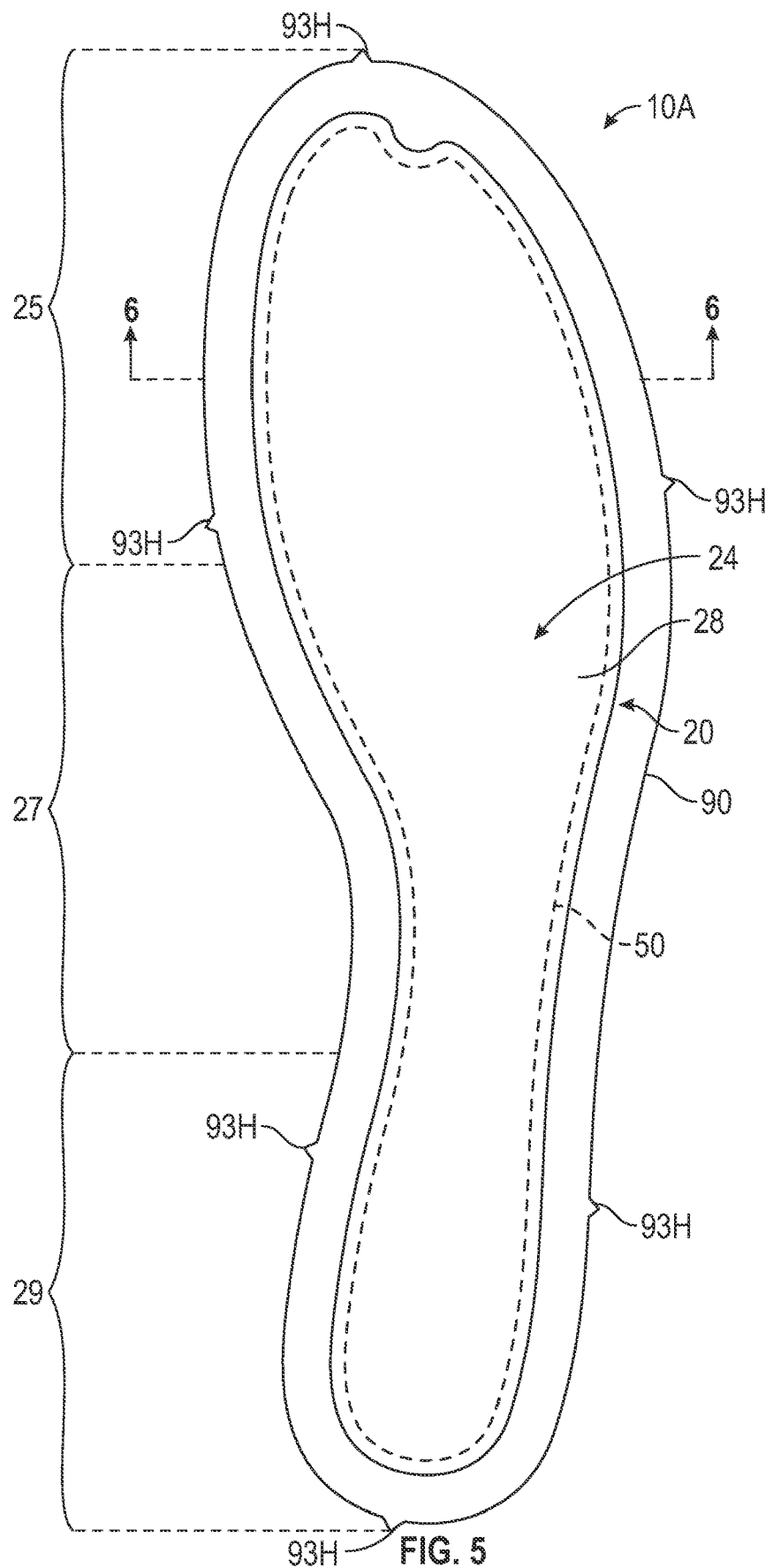
FIG. 5 is a schematic illustration in top view of an alternative embodiment of a strobel for an article of footwear.
Figure 6:
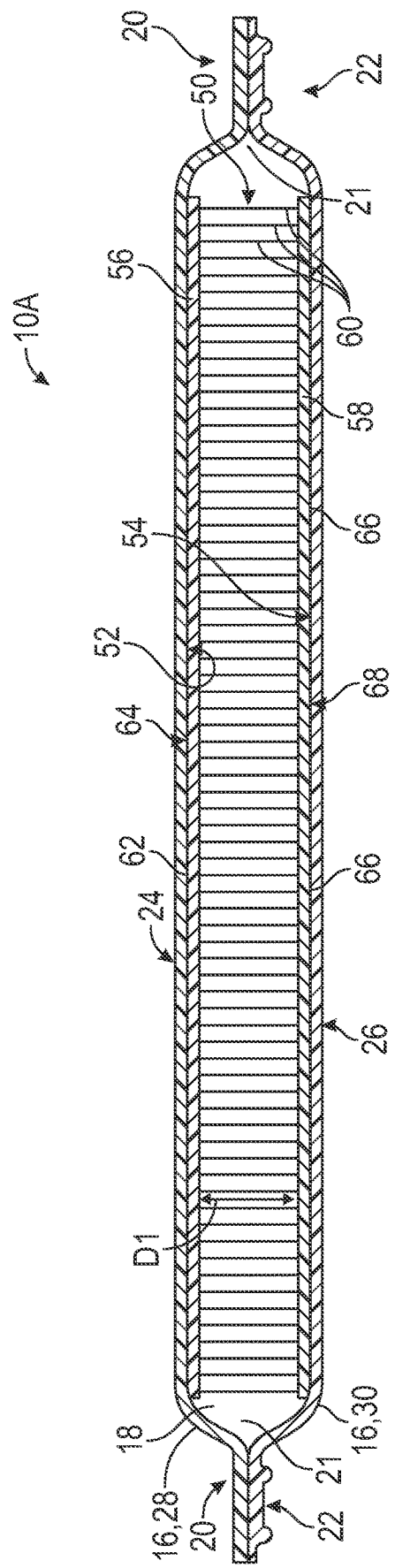
FIG. 6 is a schematic illustration in cross-sectional view of the strobel of FIG. 5 taken at lines 6-6 in FIG. 5.

FIGS. 30-32 show an embodiment of a strobel 310 that is alike in all aspects to the strobel 10A of FIG. 5 except that alignment lines 374 are printed on the strobel 310 and are used in lieu of or in addition to other alignment features. Notably, the strobel 310 has no partial welds 70, as evidenced in part by the cross-sectional view in FIG. 31. Stated differently, the tensile component 50 is welded or otherwise adhered to the inner surfaces of the polymeric sheets 28, 30, and the first and second welds W1, W2 are provided at the perimeter of the distal side 26 of the flange 20. In other embodiments, the perimeter welds W1, W2 could be on both sides of the flange 20 or could be only on the proximal side of the flange 20.

The alignment lines 374 are shown printed in a pattern similar to that of the partial welds (e.g., the inwardly-protruding bonds 70) of the strobel 10B of FIG. 28. The alignment lines 374 may be printed on the polymeric sheets 28, 30 prior to placing the sheets 28, 30 in the mold assembly 34 similar to that of FIG. 19 (but without mold insert 34C). The alignment lines 374 are shown printed on both the proximal surface 24 (FIG. 30) and the distal surface 26 (FIG. 32) of the strobel 310. In other embodiments, alignment lines may be printed only on the proximal surface 24 or only on the distal surface 26. In order to align the strobel 310 with a last 84, an identical pattern of alignment lines may be printed on the last 84 and the strobel 310 may then be aligned with the pattern printed on the last 84. In another alternative, the same pattern may be extended onto the last 84 by a laser (e.g., a light pattern), and the printed pattern of alignment lines 374 may then be aligned with the laser pattern on the last 84. It should be appreciated that only one pattern of alignment lines is shown, but a variety of different patterns may be used. The pattern of inwardly-protruding bonds 70 on the strobel 10 or 10B described herein, for example, could be aligned with the laser pattern (e.g., light pattern) on the last 84 in the same manner as described with respect to the printed pattern of alignment lines 374.

The following Clauses provide example configurations of a strobel, an article of footwear, and a method of manufacturing disclosed herein.

Clause 1: An article of footwear comprising: a strobel including: a polymeric bladder defining an interior cavity and configured to retain a fluid in the interior cavity, the polymeric bladder having a peripheral flange extending around at least a portion of a perimeter of the interior cavity; and a tensile component disposed in the interior cavity and secured to opposing inner surfaces of the polymeric bladder; wherein the peripheral flange defines a groove extending along the peripheral flange.

Clause 2: The article of footwear of clause 1, wherein the peripheral flange has a first weld and a second weld spaced apart from the first weld; the first weld and the second weld extend lengthwise along the peripheral flange, and the groove extends lengthwise along the peripheral flange between the first weld and the second weld; the first weld is inward of the groove; and the second weld is outward of the groove.

Clause 3: The article of footwear of clause 2, wherein the peripheral flange includes a first ridge protruding at an outer surface of the peripheral flange between the first weld and the groove; and the peripheral flange includes a second ridge protruding at the outer surface of the peripheral flange between the second weld and the groove.

Clause 4: The article of footwear of clause 1, wherein the polymeric bladder has a locating feature that is at least one of a notch in an outer edge of the peripheral flange, a protrusion at the outer edge of the peripheral flange, an aperture in the polymeric bladder, a weld pattern of the polymeric bladder, a printed pattern on the polymeric bladder, or a marking on the polymeric bladder.

Clause 5: The article of footwear of clause 1, wherein the polymeric bladder includes a first polymeric sheet and a second polymeric sheet; the first polymeric sheet is bonded to the second polymeric sheet at the peripheral flange; and the tensile component includes a first tensile layer, a second tensile layer, and a plurality of tethers spanning the interior cavity from the first tensile layer to the second tensile layer and connecting the first tensile layer to the second tensile layer.

Clause 6: The article of footwear of clause 5, wherein: the first polymeric sheet is joined to the first tensile layer at a plurality of inwardly-protruding bonds that protrude inward from the first polymeric sheet only partially across the plurality of tethers toward the second polymeric sheet, and the polymeric bladder is narrowed at the inwardly-protruding bonds.

Clause 7: The article of footwear of clause 6, wherein each of the inwardly-protruding bonds extends generally straight along an outer surface of the first polymeric sheet, and the inwardly-protruding bonds are arranged parallel or orthogonal relative to one another at the outer surface of the first polymeric sheet.

Clause 8: The article of footwear of clause 1, further comprising: an upper; wherein the strobel is secured to the upper by a series of stitches extending through the peripheral flange in the groove, the strobel and the upper defining a foot-receiving cavity.

Clause 9: The article of footwear of clause 8, further comprising: a midsole secured to at least one of the upper or the polymeric bladder and underlying a distal surface of the polymeric bladder.

Clause 10: The article of footwear of clause 8, further comprising: a protective cover overlying a proximal surface of the polymeric bladder and secured to the polymeric bladder at the peripheral flange.

Clause 11: A method of manufacturing footwear comprising: providing a strobel formed by: by placing a tensile component on a first polymeric sheet; placing a second polymeric sheet on the tensile component; and welding the first and second polymeric sheets to one another to define a polymeric bladder having: an interior cavity, the polymeric bladder configured to retain a fluid in the polymeric bladder, a peripheral flange extending around at least a portion of a perimeter of the interior cavity and at which the first and second polymeric sheets are welded; wherein the tensile component is disposed in the interior cavity and is secured to opposing inner surfaces of the polymeric bladder; and wherein the peripheral flange defines a groove extending along the peripheral flange.

Clause 12: The method of clause 11, further comprising: forming the strobel.

Clause 13: The method of clause 11, wherein welding the first and second polymeric sheets to one another includes welding a first weld and a second weld that are spaced apart from one another and extending lengthwise along the peripheral flange, with the groove extending lengthwise along the peripheral flange between the first weld and the second weld.

Clause 14: The method of clause 11, further comprising providing a locating feature on the strobel; wherein the locating feature is at least one of a notch in an outer edge of the peripheral flange, a protrusion at the outer edge of the peripheral flange, an aperture in the polymeric bladder, a weld pattern of the polymeric bladder, a printed pattern on the polymeric bladder, or a marking on the polymeric bladder.

Clause 15: The method of clause 11, further comprising: stitching the Strobel to an upper along the groove in the peripheral flange of the strobel so that a series of stitches extends through the peripheral flange at the groove.

Clause 16: The method of clause 15, further comprising placing the upper with the strobel stitched thereto on a last; wherein placing the upper with the strobel stitched thereto on the last includes aligning a locating feature on the strobel with a locating feature on the last.

Clause 17: The method of clause 16, wherein the locating feature on the strobel is at least one of a notch in an outer edge of the peripheral flange, a protrusion at the outer edge of the flange, an aperture in the polymeric bladder, or a marking on the polymeric bladder.

Clause 18: The method of clause 16, further comprising securing a midsole to at least one of the upper or the strobel while the upper and the strobel are on the last.

Clause 19: The method of clause 16, wherein the polymeric bladder is in an uninflated state when the strobel is stitched to the upper, and further comprising: inflating the polymeric bladder after the strobel is stitched to the upper; and sealing the interior cavity after inflating the interior cavity; wherein placing the upper with the strobel stitched thereto on the last is after inflating the polymeric bladder and sealing the interior cavity.

Clause 20: The method of clause 16, further comprising: inflating the strobel prior to stitching the strobel to the upper.

Clause 21: A strobel for an article of footwear, the strobel comprising a polymeric bladder defining an interior cavity and configured to retain a fluid in the interior cavity, the polymeric bladder having a peripheral flange extending around at least a portion of a perimeter of the interior cavity; a tensile component disposed in the interior cavity and secured to opposing inner surfaces of the polymeric bladder; and wherein the peripheral flange defines a groove extending along the peripheral flange.

Clause 22: An article of footwear comprising: an upper; a strobel including: a polymeric bladder defining an interior cavity and configured to retain a fluid in the interior cavity, the polymeric bladder having a peripheral flange extending around at least a portion of a perimeter of the interior cavity, a tensile component disposed in the interior cavity and secured to opposing inner surfaces of the polymeric bladder; wherein the peripheral flange defines a groove extending along the peripheral flange; and wherein the strobel is secured to the upper by a series of stitches extending through the peripheral flange in the groove.

Clause 23: A method of manufacturing footwear comprising: forming a strobel by placing a tensile component on a first polymeric sheet; placing a second polymeric sheet on the tensile component; and welding the first and second polymeric sheets to one another to define a polymeric bladder having: an interior cavity, the polymeric bladder configured to retain a fluid in the polymeric bladder, a peripheral flange extending around at least a portion of a perimeter of the interior cavity and at which the first and second polymeric sheets are welded; wherein the tensile component is disposed in the interior cavity and is secured to opposing inner surfaces of the polymeric bladder; and wherein the peripheral flange defines a groove extending along the peripheral flange.

Clause 24: A method of manufacturing footwear comprising: stitching a strobel to an upper along a groove in a peripheral flange of the strobel so that a series of stitches extends through the peripheral flange at the groove; wherein the strobel includes: a polymeric bladder defining an interior cavity and configured to retain a fluid in the interior cavity, the polymeric bladder including the peripheral flange extending around at least a portion of a perimeter of the interior cavity; and a tensile component disposed in the interior cavity and secured to opposing inner surfaces of the polymeric bladder.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method of manufacturing footwear comprising:
   providing a strobel formed by:
      placing a tensile component on a first polymeric sheet;
      placing a second polymeric sheet on the tensile component; and
      welding the first and second polymeric sheets to one another to define a polymeric bladder having:
         an interior cavity, the polymeric bladder configured to retain a fluid in the interior cavity; and
         a peripheral flange extending around at least a portion of a perimeter of the interior cavity and at which the first and second polymeric sheets are welded;
      wherein the tensile component is disposed in the interior cavity and is secured to opposing inner surfaces of the polymeric bladder;
      wherein the peripheral flange defines a groove extending along the peripheral flange; and
      wherein welding the first and second polymeric sheets to one another includes welding a first weld and a second weld that are spaced apart from one another and that extend lengthwise along the peripheral flange, with the groove extending lengthwise along the peripheral flange between the first weld and the second weld.

2. The method of claim 1, further comprising:
   forming the strobel.

3. The method of claim 1, further comprising:
   providing a locating feature on the strobel; wherein the locating feature is at least one of a notch in an outer edge of the peripheral flange, a protrusion at the outer edge of the peripheral flange, an aperture in the polymeric bladder, a weld pattern of the polymeric bladder, a printed pattern on the polymeric bladder, or a marking on the polymeric bladder.

4. The method of claim 1, further comprising:
stitching the strobel to an upper along the groove in the peripheral flange of the strobel so that a series of stitches extends through the peripheral flange at the groove.

5. The method of claim 4, further comprising:
placing the upper with the strobel stitched thereto on a last; wherein placing the upper with the strobel stitched thereto on the last includes aligning a locating feature on the strobel with a locating feature on the last.

6. The method of claim 5, wherein the locating feature on the strobel is at least one of a notch in an outer edge of the peripheral flange, a protrusion at the outer edge of the peripheral flange, an aperture in the polymeric bladder, a weld pattern of the polymeric bladder, a printed pattern on the polymeric bladder, or a marking on the polymeric bladder.

7. The method of claim 5, further comprising:
securing a midsole to at least one of the upper or the strobel while the upper and the strobel are on the last.

8. The method of claim 5, wherein the polymeric bladder is in an uninflated state when the strobel is stitched to the upper, and further comprising:
inflating the polymeric bladder after the strobel is stitched to the upper; and
sealing the interior cavity after inflating the interior cavity; wherein placing the upper with the strobel stitched thereto on the last is after inflating the polymeric bladder and sealing the interior cavity.

9. The method of claim 5, further comprising:
inflating the strobel prior to stitching the strobel to the upper.

10. A method of manufacturing footwear comprising:
forming a strobel by:
placing a first polymeric sheet in a mold cavity;
placing a tensile component on the first polymeric sheet;
placing a second polymeric sheet over the tensile component; and
welding the first polymeric sheet and the second polymeric sheet to one another to define a peripheral flange having a groove, and to define a polymeric bladder defining an interior cavity and configured to retain a fluid in the interior cavity, the polymeric bladder including the peripheral flange extending around at least a portion of a perimeter of the interior cavity, and the tensile component disposed in the interior cavity and secured to opposing inner surfaces of the polymeric bladder;
wherein welding the first and second polymeric sheets to one another includes welding a first weld and a second weld that are spaced apart from one another and extending lengthwise along the peripheral flange, with the groove extending lengthwise along the peripheral flange between the first weld and the second weld; and
stitching the strobel to an upper along the groove in the peripheral flange of the strobel so that a series of stitches extends through the peripheral flange at the groove with the groove in a distal surface of the polymeric bladder.

11. The method of claim 10, further comprising:
placing the upper with the strobel stitched thereto on a last.

12. The method of claim 11, wherein placing the upper with the strobel stitched thereto on the last includes aligning a locating feature on the strobel with a locating feature on the last.

13. The method of claim 12, wherein the locating feature on the strobel is at least one of a notch in an outer edge of the peripheral flange, an aperture in the polymeric bladder, or a marking on the polymeric bladder.

14. The method of claim 11, further comprising:
securing a midsole to at least one of the upper or the strobel while the upper and the strobel are on the last.

15. The method of claim 11, wherein the polymeric bladder is in an uninflated state when the strobel is stitched to the upper, and further comprising:
inflating the polymeric bladder after the strobel is stitched to the upper; and
sealing the interior cavity after inflating the interior cavity; wherein placing the upper with the strobel stitched thereto on the last is after inflating the polymeric bladder and sealing the interior cavity.

* * * * *